(12) United States Patent  
Farret

(10) Patent No.: US 12,346,716 B2  
(45) Date of Patent: Jul. 1, 2025

(54) HYBRID COMPUTING APPARATUS AND HYBRID COMPUTING ARCHITECTURES APPLICABLE TO ON PREMISES, CLOUD, AND EDGE COMPUTING APPLICATIONS

(71) Applicant: MIND IN A BOX INC., Montreal (CA)

(72) Inventor: Jeremie Farret, Verdun (CA)

(73) Assignee: MIND IN A BOX INC., Montreal (CA)

( * ) Notice: Subject to any disclaimer, the term of this patent is extended or adjusted under 35 U.S.C. 154(b) by 721 days.

(21) Appl. No.: 17/476,825

(22) Filed: Sep. 16, 2021

(65) Prior Publication Data

US 2022/0083365 A1 Mar. 17, 2022

Related U.S. Application Data

(60) Provisional application No. 63/079,364, filed on Sep. 16, 2020.

(51) Int. Cl.
    *G06F 9/455* (2018.01)
    *G06F 8/65* (2018.01)
(52) U.S. Cl.
    CPC ............ *G06F 9/45558* (2013.01); *G06F 8/65* (2013.01); *G06F 2009/4557* (2013.01); *G06F 2009/45595* (2013.01)
(58) Field of Classification Search
    None
    See application file for complete search history.

(56) References Cited

U.S. PATENT DOCUMENTS

| 2008/0049629 A1* | 2/2008 | Morrill | H04L 43/08 370/250 |
| 2013/0219230 A1* | 8/2013 | Best | G06F 11/008 714/E11.02 |

(Continued)

OTHER PUBLICATIONS

S. Seetharaman, V. Hilt, M. Hofmann and M. Ammar, "Preemptive Strategies to Improve Routing Performance of Native and Overlay Layers," IEEE Infocom 2007—26th IEEE International Conference on Computer Communications, Anchorage, AK, USA, 2007, pp. 463-471 (Year: 2007).*

(Continued)

*Primary Examiner* — Frank D Mills
(74) *Attorney, Agent, or Firm* — BCF LLP

(57) ABSTRACT

A hybrid computing apparatus comprises a virtualization module receiving a task from a client application, defining a service call for the task, receiving a service result, and transmitting the service result to the client application. A layer 2 software-defined networking (SDN) component receives the service call from the virtualization module via a layer 3 SDN component, transmits the service call to a processing unit, receives the service result from the processing unit, and forwards the service result to the virtualization module via the layer 3 SDN component. The task may be split into several service calls transmitted to several processing units, from which sub-results are received and combined. A combination comprises two apparatuses, in which the virtualization module and the layer 3 SDN component are disabled in a second apparatus. The layer 2 SDN component of the second apparatus communicates with the layer 3 SDN component of a first apparatus.

14 Claims, 37 Drawing Sheets

(56) References Cited

U.S. PATENT DOCUMENTS

| | | | |
|---|---|---|---|
| 2015/0195178 A1 | 7/2015 | Bhattacharya et al. | |
| 2015/0371031 A1* | 12/2015 | Ueno | G06F 21/335 |
| | | | 726/21 |
| 2016/0087885 A1* | 3/2016 | Tripathi | H04L 12/4633 |
| | | | 370/389 |
| 2017/0177396 A1 | 6/2017 | Palermo et al. | |
| 2017/0237667 A1 | 8/2017 | Wang | |
| 2017/0371692 A1* | 12/2017 | Connolly | G06F 9/45558 |
| 2018/0212866 A1* | 7/2018 | Kumar | H04L 41/40 |
| 2019/0036868 A1* | 1/2019 | Chandrashekhar | H04L 45/021 |
| 2019/0036968 A1 | 1/2019 | Sela et al. | |
| 2019/0068544 A1* | 2/2019 | Hao | H04L 61/103 |
| 2019/0250958 A1* | 8/2019 | Kumar | G06F 9/5038 |
| 2020/0233691 A1* | 7/2020 | Rizvi | G06F 11/203 |
| 2021/0234920 A1* | 7/2021 | Chauhan | H04L 67/01 |

OTHER PUBLICATIONS

"Armada 385 Based CPE and Network Appliance", SILICOM Connectivity Solutions, accessed on https://www.silicom-usa.com/pr/edge-networking-solutions/edge-cpes/armada-385-based-cpe/ on Sep. 8, 2020, 2 pages.

"Security Gateway Manual", Netgate, SG-3100, accessed on https://docs.netgate.com/pfsense/en/latest/solutions/sg-3100/index.html on Sep. 15, 2021, 43 pages.

"Security Gateway Manual", Netgate, XG-7100-1U, accessed on https://docs.netgate.com/pfsense/en/latest/solutions/xg-7100-1u/index.html on Sep. 15, 2021, 85 pages.

International Search Report (and Translation) and Written Opinion with regard to PCT/IB2021/058464 mailed Dec. 29, 2021.

EP Communication issued Sep. 19, 2024 and European Search Report with regard to the counterpart EP Patent Application No. 21868847.1.

* cited by examiner

HYBRID COMPUTING APPARATUS AND HYBRID COMPUTING ARCHITECTURES APPLICABLE TO ON PREMISES, CLOUD, AND EDGE COMPUTING APPLICATIONS

CROSS-REFERENCE

The present application claims priority from U.S. Provisional Patent Application Ser. No. 63/079,364, filed on Sep. 16, 2020, the disclosure of which is incorporated by reference herein in its entirety.

FIELD

The present technology relates to systems and methods of distributed computing systems. In particular, present technology introduces a hybrid computing apparatus and a hybrid computing architecture.

BACKGROUND

Hybrid computing making use of fog computing, edge computing, on premises computing and cloud computing is increasingly being used to place computing devices in locations that are close to where their services are needed. Reducing distances between the computing devices and other devices, for example controllers and sensors, in turn reduces bandwidth requirements while improving response times. Virtualization, from the standpoint of clients using applications provided by processing units, and load balancing of various client-initiated tasks between a number of processing units are some of the key advances provided by edge computing, fog computing, on premises computing, cloud computing and similar computing architectures.

Conventional hybrid computing architectures still suffer from a number of drawbacks in terms of Edge and Fog equipment density and form factor, performance, stability, load balancing, service rationalization, information and data privacy, scalability, and service virtualization.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

According to one aspect of the present technology, there is provided a hybrid computing apparatus, comprising:
  a virtualization module configured for:
    receiving a task from a client application,
    defining a service call for the received task,
    receiving a service result, and
    transmitting the service result to the client application;
  a layer 3 software-defined networking component; and
  a layer 2 software-defined networking component, the layer 2 software-defined networking component being configured for:
    receiving the service call from the virtualization module via the layer 3 software-defined networking,
    transmitting the service call to a processing unit,
    receiving the service result from the processing unit, and
    forwarding the service result to the virtualization module via the layer 3 software-defined networking.

In some implementations of the present technology, the hybrid computing apparatus further comprises a programmable component for implementing the virtualization module or a virtualized network function.

In some implementations of the present technology, the layer 3 software-defined networking component uses layer 3 hardware acceleration; and the layer 2 software-defined networking component uses layer 2 hardware acceleration.

In some implementations of the present technology, the virtualization module is further configured for: receiving data governance information defining rules for authorizing access to user data; receiving an identity of a user from a user directory; and selecting the processing unit based on an information triplet including the identity of a user, data for the user, and a list of authorized processing units authorized to access the data for the user, the list being determined according to the data governance information.

In some implementations of the present technology, the virtualization module is further configured for: receiving a software update package for the processing unit from an operation system docker; receiving a command to deploy the software update from a system administrator; and deploying the software update to the processing unit without establishing a direct interface between the system administrator and the processing unit, whereby the system administrator is prevented from accessing data present in the processing unit.

In some implementations of the present technology, the virtualization module is further configured for: splitting the task call into a plurality of service calls, receiving a plurality of sub-results, and combining the plurality sub-results into the service result for transmission to the client application; and the layer 2 software-defined networking component is further configured for: transmitting the plurality of service calls to a plurality of processing units, receiving the plurality of sub-results from the plurality of processing units, and forwarding the plurality of sub-results to the virtualization module via the layer 3 software-defined networking component.

In some implementations of the present technology, the layer 2 software-defined networking component is further configured for: receiving temperature measurements from each of the plurality of processing units, and forwarding the temperature measurements to the virtualization module via the layer 3 software-defined networking component; and the virtualization module of the first hybrid computing apparatus is further configured for assigning each of the plurality of service calls to selected ones of the plurality of processing units based on their respective temperature measurements.

According to another aspect of the present technology, there is provided a combination, comprising:
  a first hybrid computing apparatus as defined in the previous paragraphs; and
  a second hybrid computing apparatus as defined in the previous paragraphs, the virtualization module and the layer 3 software-defined networking component of the second hybrid computing apparatus being disabled, the layer 2 software-defined networking component of the second hybrid computing apparatus being communicatively connected to the layer 3 software-defined networking component of the first edge computing device.

According to a further aspect of the present technology, there is provided a combination, comprising:
- a first hybrid computing apparatus as defined in the previous paragraphs; and
- a second hybrid computing apparatus comprising a layer 2 software-defined networking component being communicatively connected to the layer 3 software-defined networking component of the first edge computing device.

In some implementations of the present technology, the first hybrid computing apparatus is a head apparatus and the second hybrid computing apparatus is a processing apparatus.

In some implementations of the present technology, the virtualization module of the first hybrid computing apparatus is further configured for: splitting the task into a plurality of service calls, receiving a plurality of sub-results, and combining the plurality sub-results into the service result for transmission to the client application; the layer 2 software-defined networking component of the first hybrid computing apparatus is further configured for: transmitting a first subset of the plurality of service calls to a first subset of the plurality of processing units, receiving a first subset of the plurality of sub-results from the first subset of the plurality of processing units, and forwarding the first subset plurality of sub-results to the virtualization module via the layer 3 software-defined networking component of the first hybrid computing apparatus; and the layer 2 software-defined networking component of the second hybrid computing apparatus is further configured for: transmitting a second subset of the plurality of service calls to a second subset of the plurality of processing units, receiving a second subset of the plurality of sub-results from the second subset of the plurality of processing units, and forwarding the second subset plurality of sub-results to the virtualization module via the layer 3 software-defined networking component of the first hybrid computing apparatus.

In some implementations of the present technology, the virtualization module of the first hybrid computing apparatus is further configured for causing the layer 3 software-defined networking component of the first hybrid computing apparatus to forward the first subset of the plurality of service calls to the layer 2 software-defined networking component of the first hybrid computing apparatus and to forward the second subset of the plurality of service calls to the layer 2 software-defined networking component of the second hybrid computing apparatus.

In some implementations of the present technology, the layer 2 software-defined networking component of the first hybrid computing apparatus is further configured for: receiving first temperature measurements from each of the first subset of the plurality of processing units, and forwarding the first temperature measurements to the virtualization module via the layer 3 software-defined networking component of the first hybrid computing apparatus; the layer 2 software-defined networking component of the second hybrid computing apparatus is further configured for: receiving second temperature measurements from each of the second subset of the plurality of processing units, and forwarding the second temperature measurements to the virtualization module via the layer 3 software-defined networking component of the first hybrid computing apparatus; and the virtualization module of the first hybrid computing apparatus is further configured for assigning each of the plurality of service calls to selected ones of the plurality of processing units based on their respective temperature measurements.

In some implementations of the present technology, the further comprises one or more additional hybrid computing apparatuses, each additional hybrid computing apparatus comprising a respective layer 2 software-defined networking component being communicatively connected to the layer 3 software-defined networking component of the first edge computing device.

According to yet another aspect of the present technology, there is provided a hybrid computing architecture, comprising:
- the hybrid computing apparatus as defined in the previous paragraphs;
- a client application configured for submitting a task to the hybrid computing apparatus; and
- one or more processing units configured for executing one or more service calls related to the task.

According to a still further aspect of the present technology, there is provided a hybrid computing architecture, comprising:
- the combination as defined in the previous paragraphs;
- a client application configured for submitting a task to the first hybrid computing apparatus; and
- one or more processing units configured for executing one or more service calls related to the task.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid-state drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
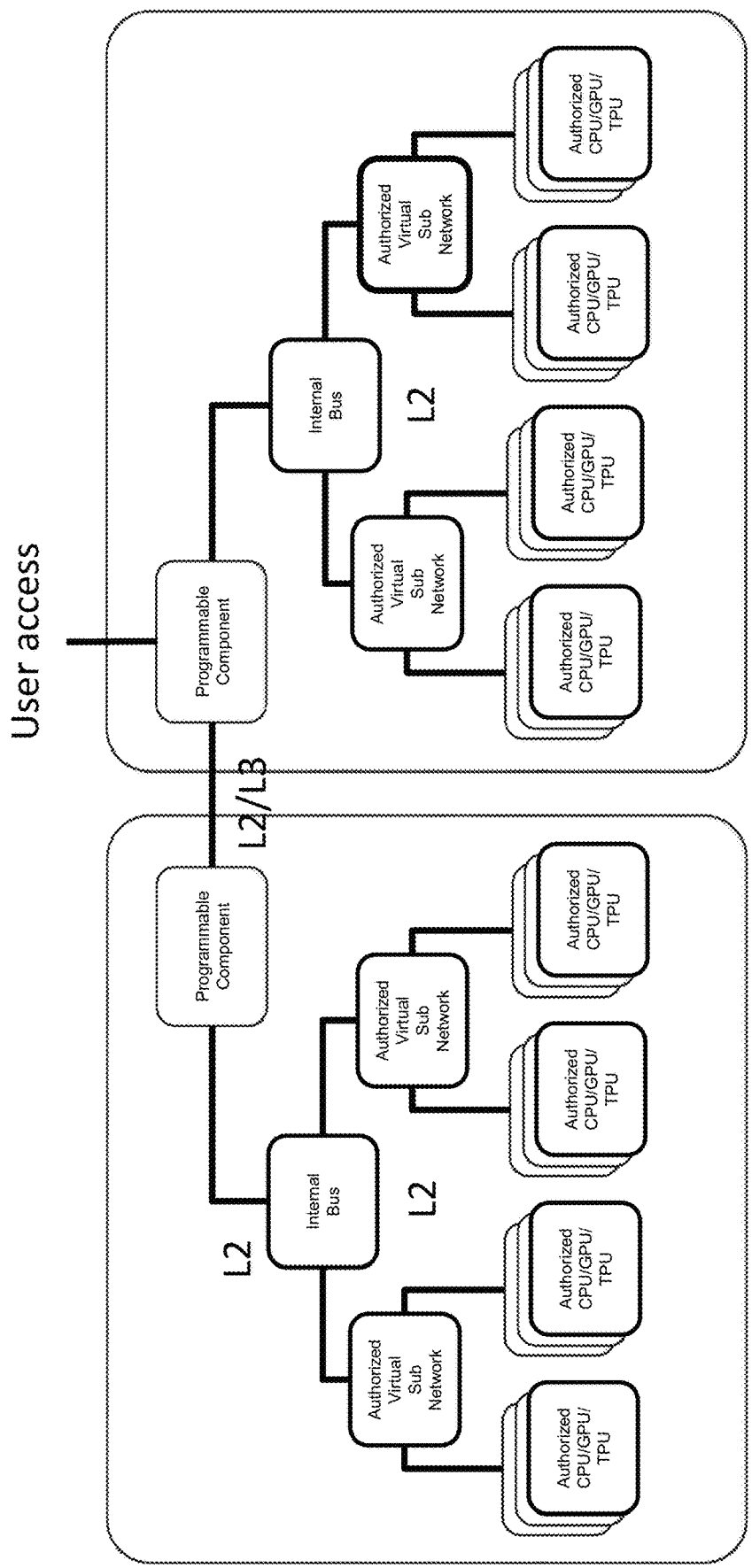
FIG. 1 is a network diagram showing a scalable hybrid computing architecture in accordance with an embodiment of the present technology.

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP), a graphical processing unit (GPU), or a tensor processing unit (TPU). Moreover, explicit use of the term a "processor" should not be construed to refer exclusively to hardware capable of executing software, and may implicitly include, without limitation, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology, a hybrid computing apparatus is installed within a hybrid computing architecture (or in an edge computing topology). The hybrid computing apparatus allows conferring to the hybrid computing architecture an enlarged distribution of processing units allocated to executing service calls for a number of tasks submitted to the hybrid computing apparatus by client applications. The hybrid computing architecture may include a single hybrid computing apparatus that receives tasks and defines service calls that are forwarded to service units. Alternatively, the hybrid computing architecture may include a combination in which one hybrid computing apparatus acts as a "head apparatus" and communicates with the client applications and with other nodes, in addition to issuing service calls to processing units. One or more additional hybrid computing apparatuses act as "processing apparatuses" that receive service calls from the head apparatus and forward the service calls to more processing units. There is no limit to the number of processing apparatuses that may relate to the head apparatus. There is no limit to a distance between the head apparatus and any related processing apparatus.

With these fundamentals in place, we will now consider some non-limiting examples to illustrate various implementations of aspects of the present technology.

Figure 2:
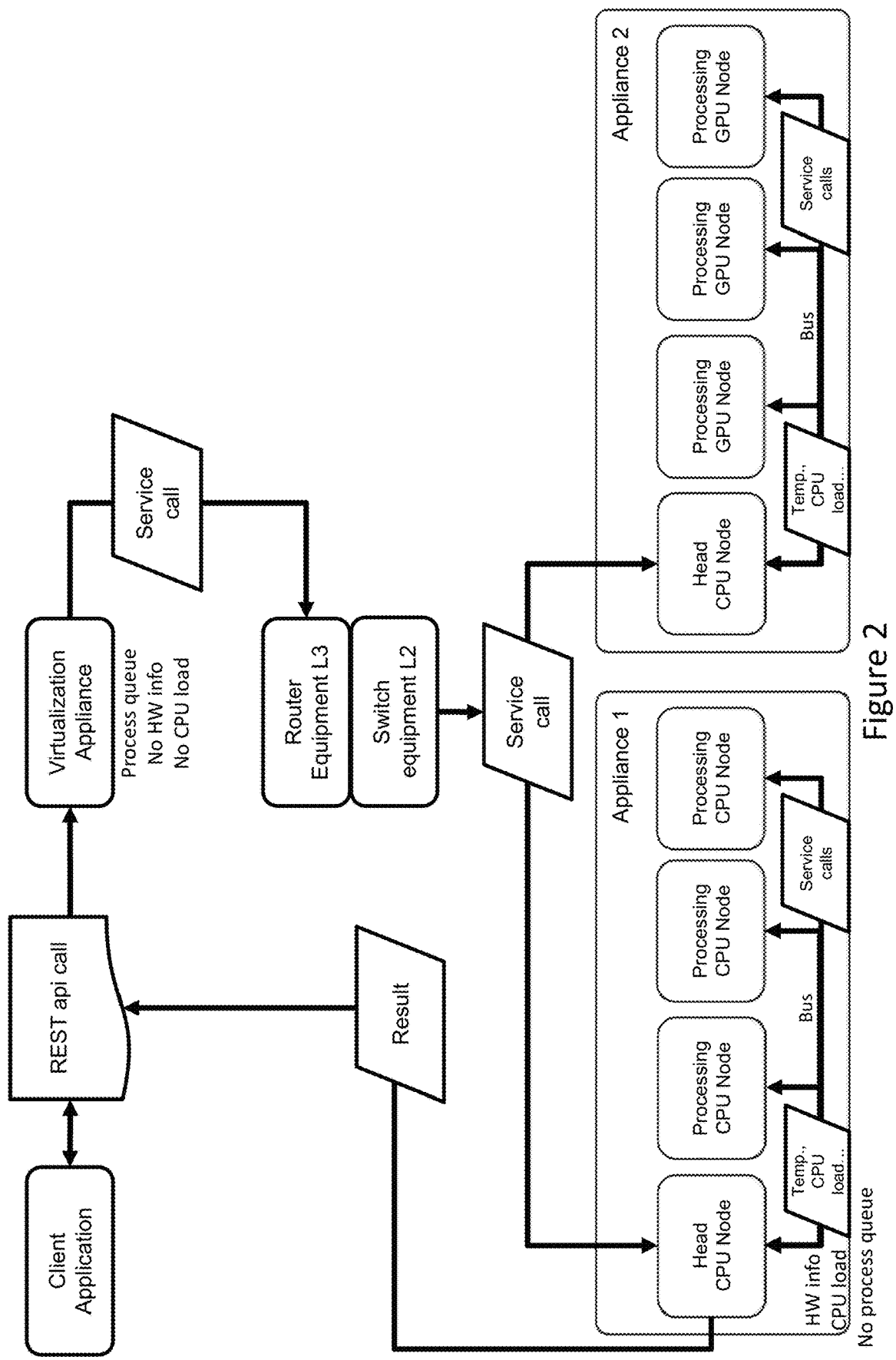
FIG. 2 is a flow diagram showing signaling taking place in the network diagram of FIG. 1 for support of virtualized services in accordance with an embodiment of the present technology.

FIG. 1 is a network diagram showing a scalable hybrid computing architecture in accordance with an embodiment of the present technology. FIG. 2 is a flow diagram showing signaling taking place in the network diagram of FIG. 1 for support of virtualized services in accordance with an embodiment of the present technology. The architecture of FIG. 1 places virtualization at the level of edge cloud computing calls. This establishes a principle wherein two appliances are used to practically form a single controller without having an additional virtualization appliance. The appliance is programmable and is modified when compared to a conventional programmable router in that is uses a portable operating system interface (POSIX) layer placed within the complex architecture found in datacenters.

Figure 3:
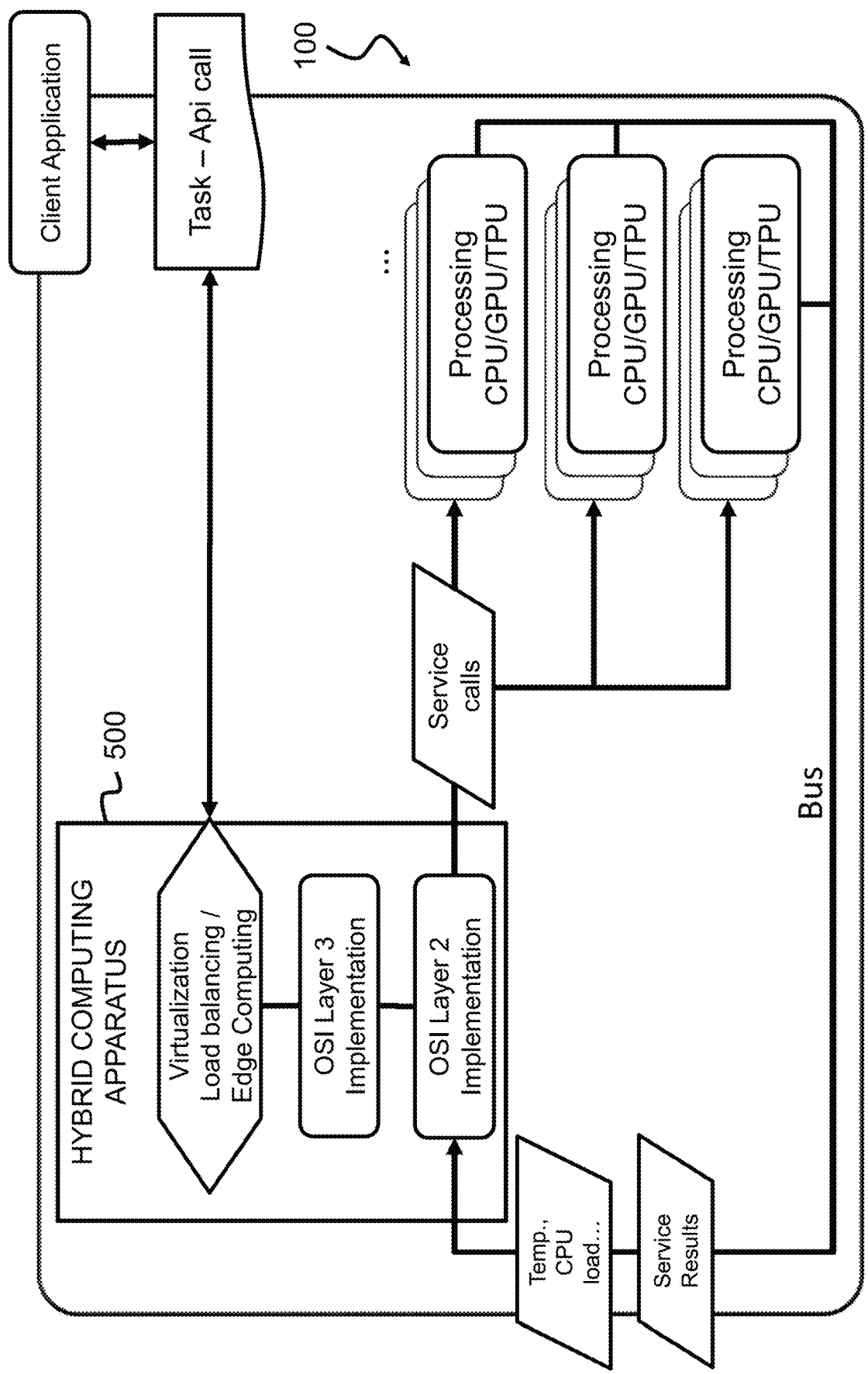
FIG. 3 is a network diagram showing a hybrid computing architecture integrating a hybrid computing apparatus in accordance with an embodiment of the present technology.
Figure 4:
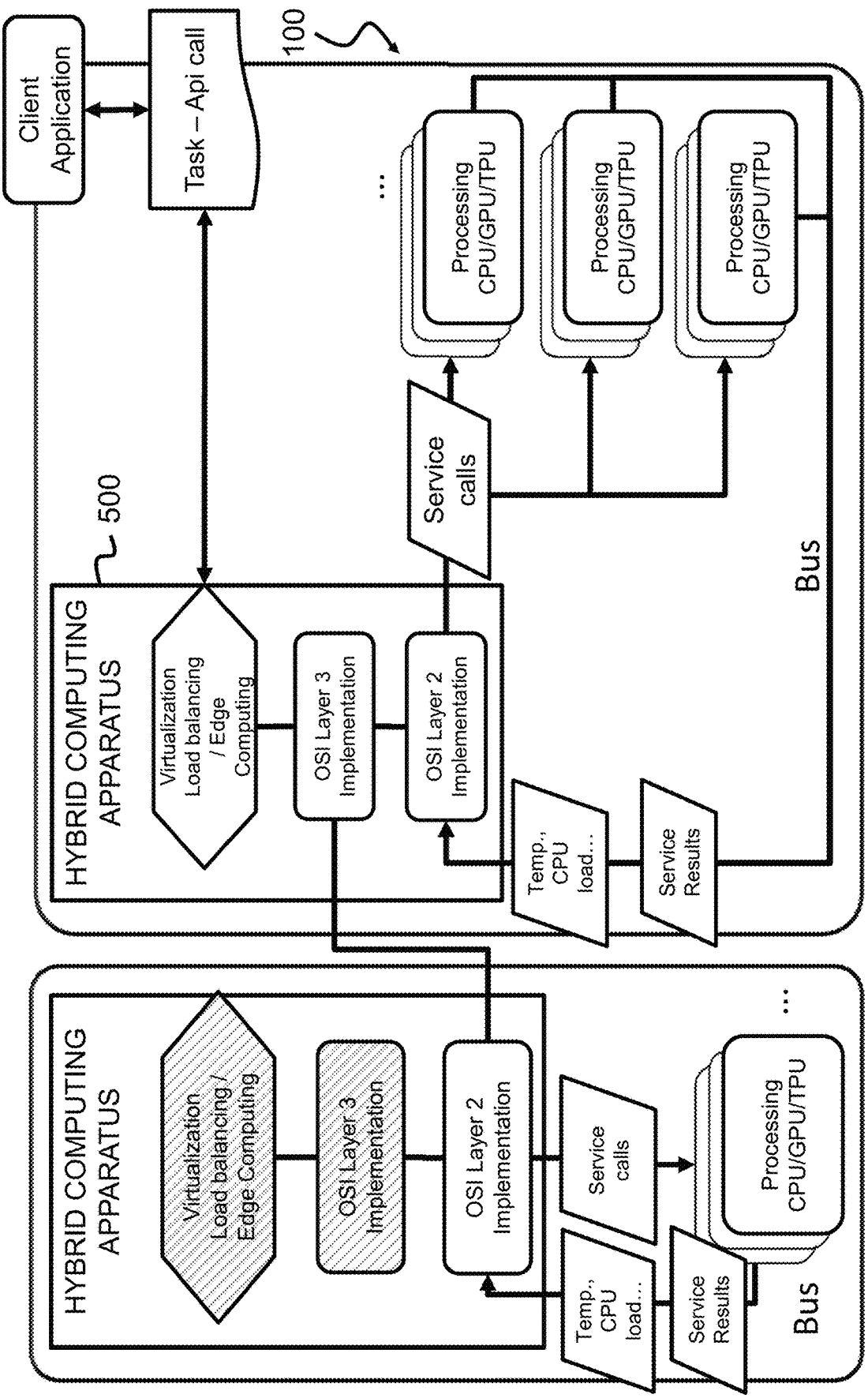
FIG. 4 illustrates an extension of the hybrid computing architecture of FIG. 3 including an additional hybrid computing apparatus in accordance with an embodiment of the present technology.

FIG. 3 is a network diagram showing a hybrid computing architecture 100 integrating a hybrid computing apparatus 500 in accordance with an embodiment of the present technology. FIG. 4 illustrates an extension of the hybrid computing architecture 100 of FIG. 3 including an additional hybrid computing apparatus 500 in accordance with an embodiment of the present technology. The hybrid computing apparatus 500 includes a programmable component, so many of its features may be implemented by use of software programs defining virtual networking functions. Non-limiting examples of hardware that may be used as programmable components include a Netgate™ XG 7100, a Netgate™ SG 3100, a Marvell™ Armada 385, a ClearFog™ GTR L8, an Orange™ Pi, an Intel™ NUC, and the like. The hybrid computing apparatus 500 uses the POSIX layer to build around a new hybrid computing architecture (or topology) 100 allowing, when two or more cooperating hybrid computing apparatuses 500 are used, to obtain a high level of scalability. In the hybrid computing apparatus 500 shown on the left-hand side of FIG. 4, a virtualization module and an accelerated layer 3 component may be disabled or may be absent altogether. At the time of configuration of the hybrid computing architecture 100, arbitration is used to select one of the hybrid computing apparatuses 500 as the head apparatus and to define any other available hybrid computing apparatuses as processing apparatuses. POSIX layers in the head apparatus manage the virtualization function with the hybrid computing architecture 100. It is understood that, in at least some embodiments, the virtualization module may be implemented as a software component configured to operate certain virtualization tasks, such as, but without being limitative, receiving a task from a client application, defining a service call for the received task, receiving a service result, and/or transmitting the service result to the client application. The hybrid computing apparatus 500 includes both layer 2 and layer 3 software-defined networking components, which may for example be supported by hardware acceleration. It is understood that, in at least some embodiments of the present technology, software-defined networking components may refer to software-implemented components, dedicated hardware devices, non-dedicated hardware devices or a combination thereof. In some embodiments, the software-defined networking components may be implemented as software components configured to operate certain networking tasks, such as, but without being limitative, receiving the service call from the virtualization module via the layer 3 software-defined networking component, transmitting the service call to a processing unit, receiving the service result from the processing unit, and/or forwarding the service result to the virtualization module via the layer 3 software-defined networking component.

It is also understood that, in at least some embodiments of the present technology, reference is made to software-defined networking so as to convey the notions of dynamic, flexible programmatically efficient network configuration management, like the concept of cloud computing, in contrast with static architecture of traditional networking devices. More information relating to software-defined networking is provided below in the definition section of the present document.

This configuration made according to the OSI model allows the layer 3 software-defined networking component of the head apparatus to communicate with the layer 2 software-defined networking component of the head and processing apparatuses. The POSIX programmability introduced in the programmable component of each hybrid computing apparatus 500 makes it possible to reduce the costs related to the storage in flash memory because a simple and inexpensive component is enough to implement Linux. This technology is in contrast with conventional solutions that use POSIX programming simply to reduce software update costs and without introducing virtualization and scalability.

Considering FIG. 4, the processing apparatus (the hybrid computing apparatus 500 on the left) may be located at any distance, for example thousands of kilometers, away from the head processing apparatus (the hybrid computing apparatus 500 on the right). Despite any distance between these nodes, they are still operating as if they were co-located, for example in a same datacentre. From a logical standpoint, the head apparatus is the only one that logically exists, being visible to other nodes. The head apparatus has access to all computing units of the architecture 100 (inasmuch as this access is authorized by data governance) via layer 2 access through the processing apparatuses. In summary, the hybrid computing apparatuses 500 acting as processing units may be viewed as operating as simple layer 2 switches.

Figure 5:
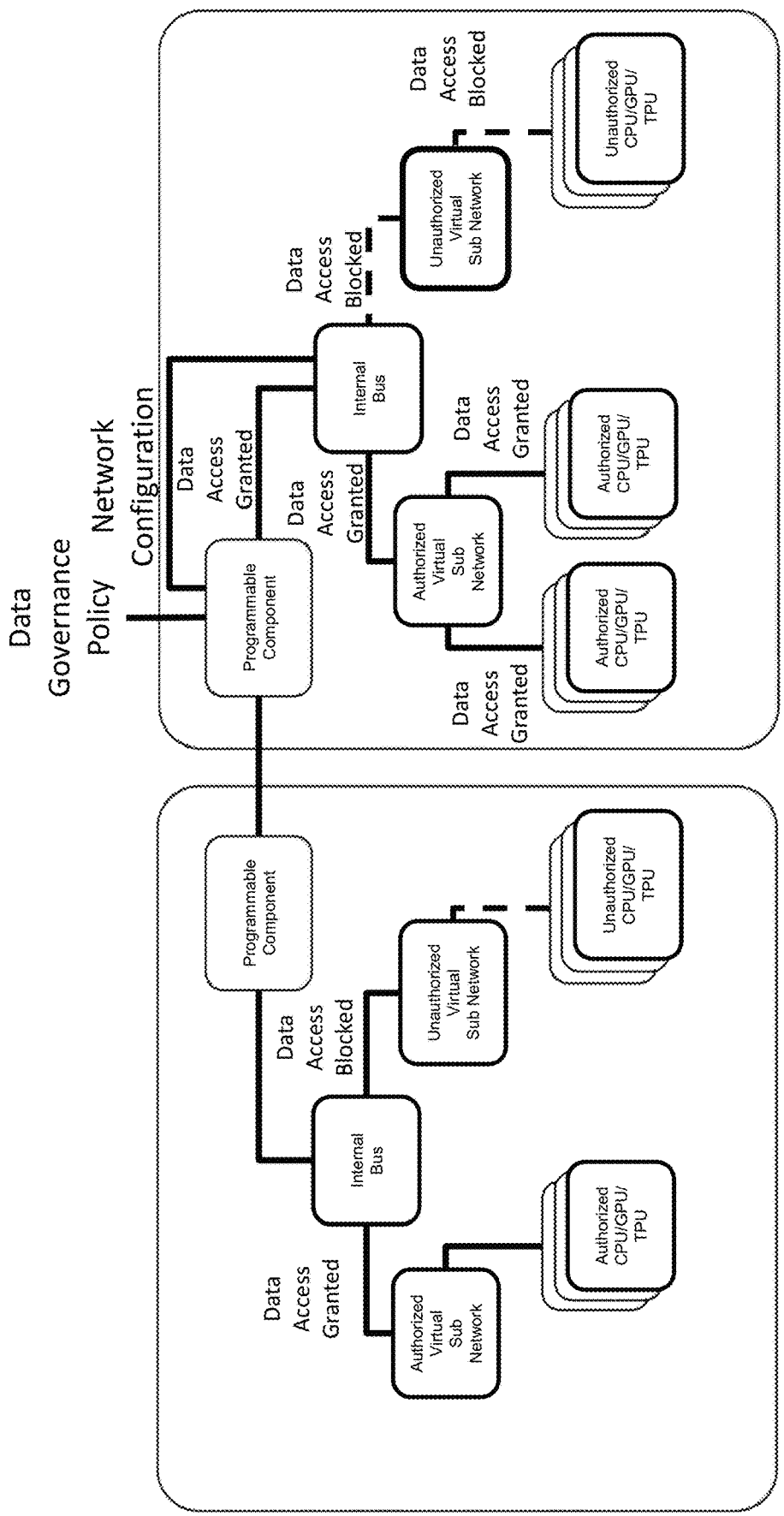
FIG. 5 illustrates how information privacy and data protection is implemented the scalable hybrid computing architecture of FIG. 1 in accordance with an embodiment of the present technology.

FIG. 5 illustrates how information privacy and data protection are implemented the scalable hybrid computing architecture of FIG. 1 in accordance with an embodiment of the present technology. Network partitioning may be used to ensure that only some of the processing units may have access to data for a given user. Data governance policy applied to one or more programmable components, and network configuration information distributed from the programmable components, may be used to ensure that some processing units, connected to the programmable components via solid lines, are authorized to gain access to data for a given user. Other processing units, connected to the programmable components via dashed lines, do not have access to data for the given user. As such, if an unauthorized node becomes compromised, it will fail to access data from an authorized node. This configuration provides a notion of additional security. Security benefits are obtained at the same time as rationalization due to the removal of intermediaries and due to the centralization of information that would be distributed in a conventional architecture. The hybrid computing architecture of FIG. 5 is suitable for load balancing, managed services or tuning, which was difficult to provide with earlier topologies due to that information required for load balancing was found at a very high level of virtualization while, at the same time, the relative information material and security were found at lowest level. Using a single point to locate these information elements allows multiple factors to be considered in the same place, thereby streamlining and avoiding expensive multi-level communications between various system components.

Figure 6:
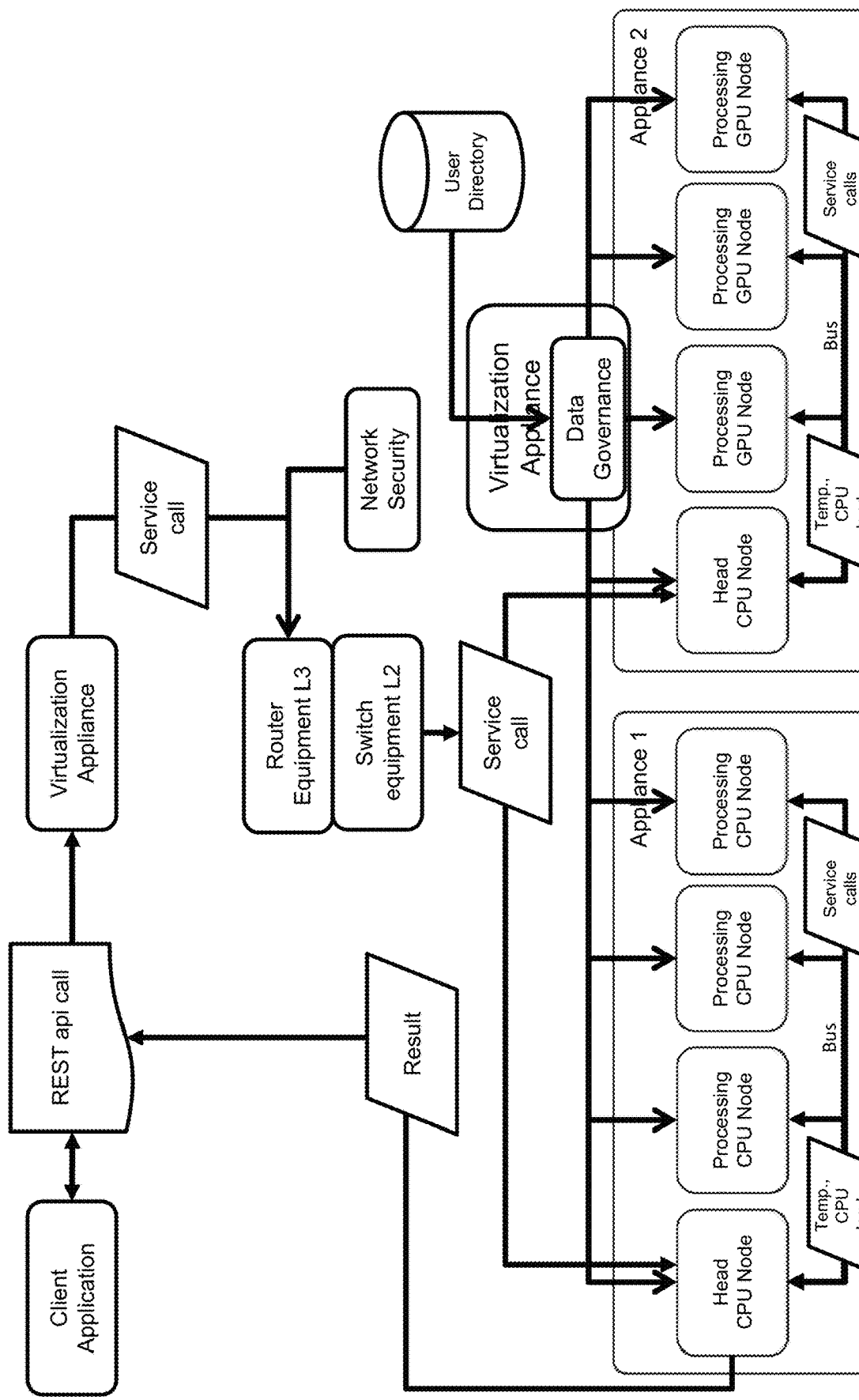
FIG. 6 is a modified flow diagram of FIG. 2 in which signaling related to data governance for information privacy and data protection is implemented in accordance with an embodiment of the present technology.

FIG. 6 is a modified flow diagram of FIG. 2 in which signaling related to data governance for information privacy and data protection is implemented in accordance with an embodiment of the present technology. Data governance and user directory information are injected in a virtualization appliance positioned at a low level in the architecture, in direct contact with the processing units. The virtualization appliance is actually split into 2 components, given that one such component is positioned at a high level in the architecture, for purposes of balancing the load apply to the various processing units.

There are typically 2 approaches to securing data. On the one hand, network security consists of giving people access only to the nodes that will be used in relation to the tasks that have been requested, where the lower positioned virtualization appliance is positioned. This may ensure that the client, with his API through appliance virtualization, will have restricted access. In most cases, this amounts to providing access to the virtualization appliance. This is a relatively basic and rustic solution because virtualization means that the client is never actually given access to the processing units. In contrast, the network administrator does have access to all processing units. Thus, network security is relatively simple because access is given to the virtualization appliance and to the processing units as needed.

On the other hand, data governance can be quite complex, because it is desired to access data according to user rights, which may often depend on the login used by the client. Thus, all processing units may be impacted by data governance. Each time a service call for a task runs is executed on a processing unit, there needs to be a verification of the user credentials, in the user directory, that the user has access rights to the data. This can only be done at the lowest level (i.e. between data governance and the processing units). There is therefore great complexity in terms of the conventional architecture to solve the problem of data governance. This can only be set at the lowest level in a virtualization scheme, because it depends on the data that is accessed, and not the operations that are done on the data. In fact, the term "data governance" reflects the fact that the user rights are tied to the data rather than operations that are run on the data. A functional API does not supply the necessary information allowing to restrict operations. Consequently, data governance needs to be applied at the lowest level, given that a determination of which client may access data needs to be determined based on an information triplet including the identity of a user, data for the user, and a list of authorized processing units authorized to access the data for the user. This triplet is only available at the lowest levels in the architecture of FIG. 6.

Figure 7:
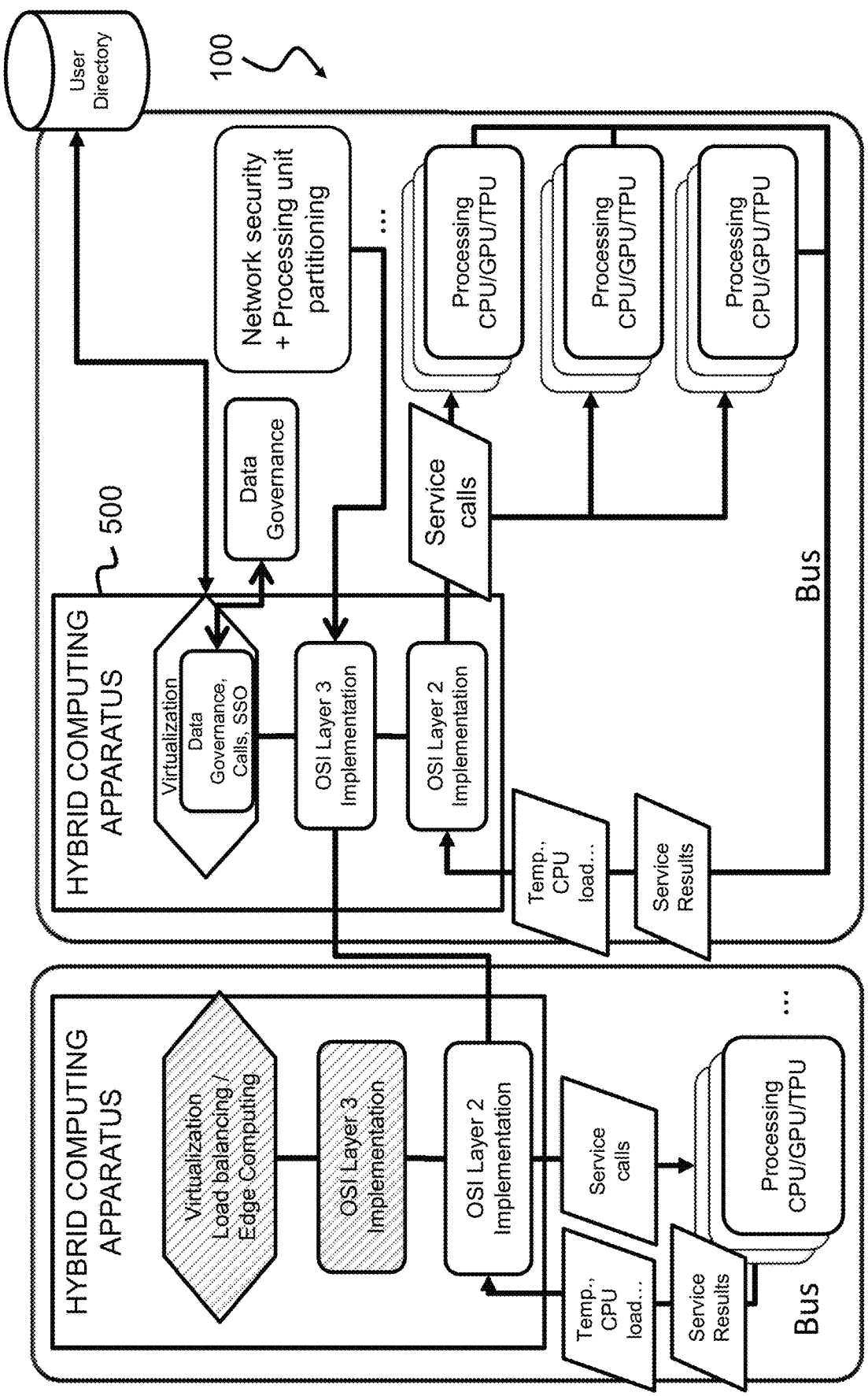
FIG. 7 illustrates an implementation of the signaling related to data governance of FIG. 6 into the computing architecture of FIGS. 3 and 4 in accordance with an embodiment of the present technology.

FIG. 7 illustrates an implementation of the signaling related to data governance of FIG. 6 into the computing architecture of FIGS. 3 and 4 in accordance with an embodiment of the present technology. As shown on FIG. 7, data governance is moved to the hybrid computing apparatus 500, at the level of virtualization by, centralizing the user directory. Hence, in contrast with the architecture of FIG. 6, data governance information is present at the hybrid computing apparatus 500, which also has access to all of the computing units and may control load balancing. The hybrid computing apparatus 500 acting as the head apparatus has a direct access to all the processing units. In fact, its virtualization module has access to both the processing units and also the information triplet including the identity of a user, data for the user, and a list of authorized processing units authorized to access the data for the user. This simplifies data governance and provides a single point of entry to the user directory. In addition, it may provide an additional security feature in that the virtualization module may use the information triplet limit access to client data only to selected processing units.

Figure 8:
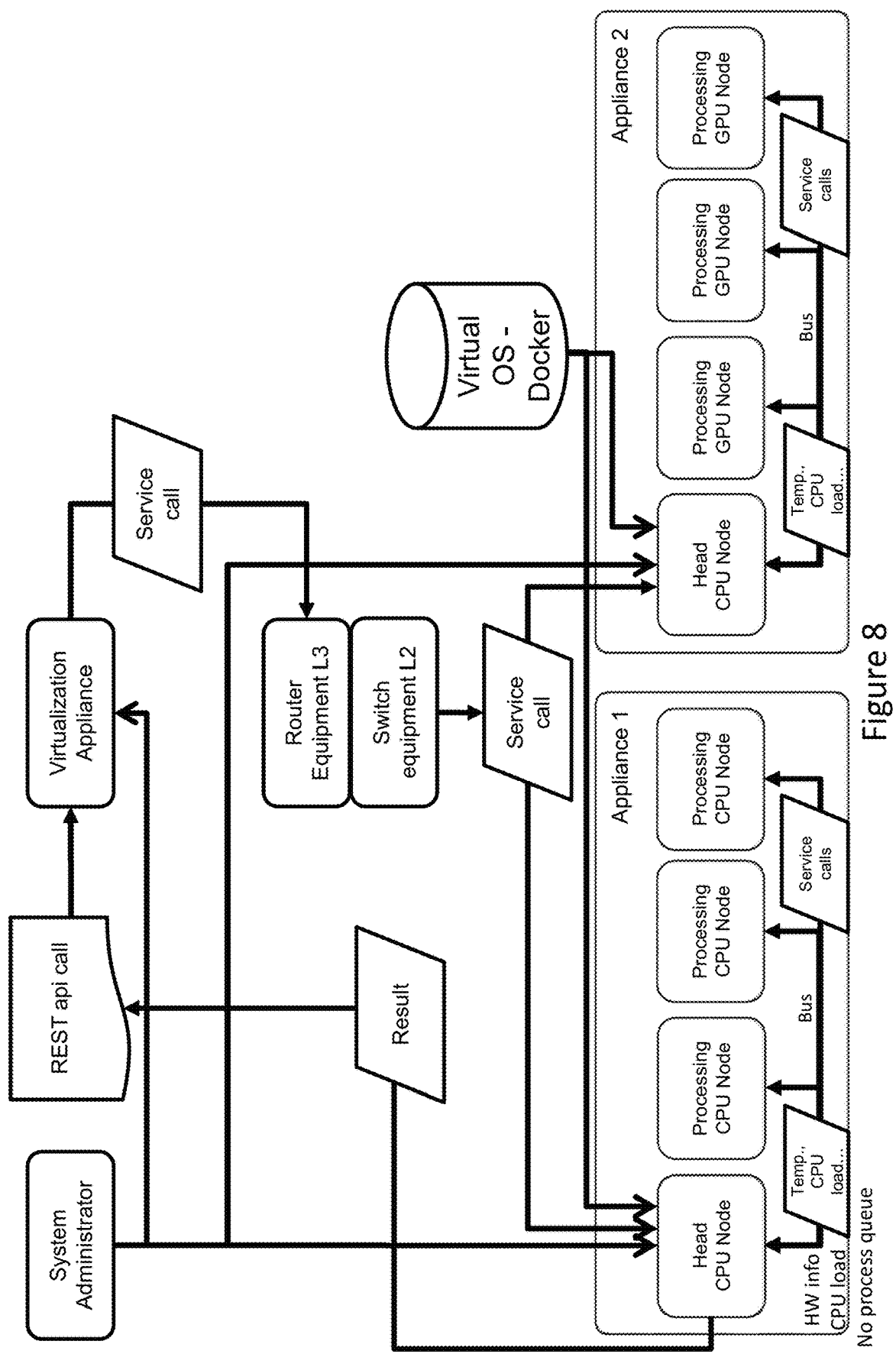
FIG. 8 is a modified flow diagram of FIG. 2 in which signaling related to managed services rationalization is implemented in accordance with an embodiment of the present technology.

FIG. 8 is a modified flow diagram of FIG. 2 in which signaling related to managed services rationalization is implemented in accordance with an embodiment of the present technology. The system administrator is not directly concerned by API calls, as are the client applications. Rather, the system administrator is concerned with updating the various appliances by deploying patches at frequent intervals, for example every week or every month. FIG. 8 shows arrows connecting the system administrator to the virtualization appliance and to the various processing units for software deployment. As shown, the system administrator is only connected to head processing units, which in turn forward the patches to other processing units. Alternatively the system administration may be directly connected to all processing units.

In the architecture of FIG. 8, the system administrator is provided access to all processing units, and may thus examine all of their data. This may constitute a security breach. For example, a system administration located in a first country may be given access to processing units located in a second country. Although client users of the second country may require their data to be processed by processing units located in the second country, the system administrator of the first country may be required to fetch their data, for example by the Patriot Act. In this scenario, there may be a security breach that is not at the level of the hosting hardware, but rather at the level of human intervention.

The proposed solution described in the FIG. 8 architecture permits to greatly limit human system administration endpoint access requirements. It can thus enable reduced end user data exposition through enforcing automated system administration procedures and limited access rights to human system administrators.

Figure 9:
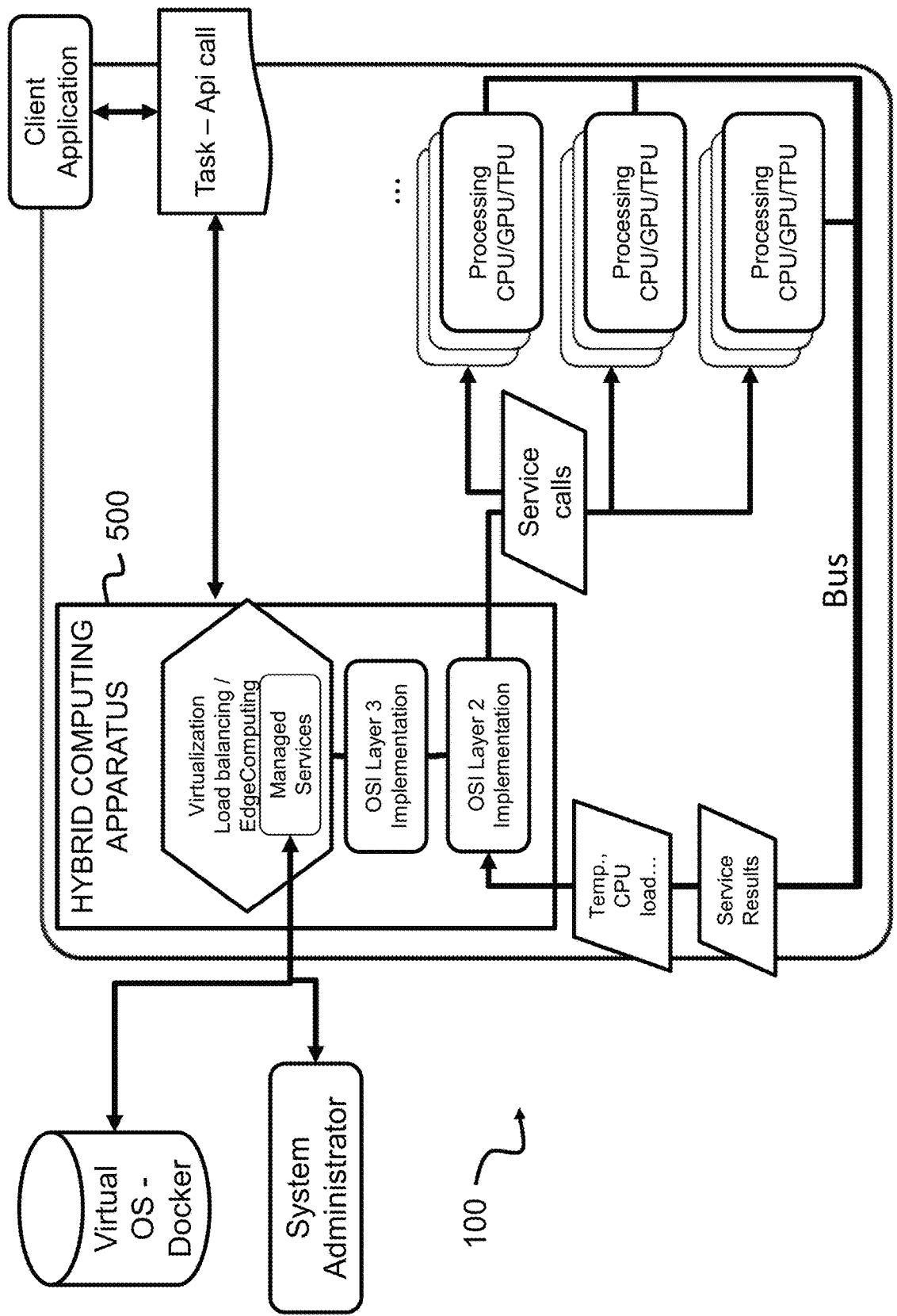
FIG. 9 illustrates an implementation of the signaling related to data governance of FIG. 8 into the computing architecture of FIG. 3 in accordance with an embodiment of the present technology.

FIG. 9 illustrates an implementation of the signaling related to data governance of FIG. 8 into the computing architecture of FIG. 3 in accordance with an embodiment of the present technology. In this variant of the hybrid computing architecture 100, interventions from the system administrator stop at the level of the virtualization module of the hybrid computing apparatus 500, which also receives software patches in the form of OS images from a virtual OS docker. Thus, the updates that will be deployed at the level of the processing units are virtualized by means of this docker type system because the OS images are placed by the system administrator at top level of the hybrid computing architecture 100. All other operations for deploying the software patches are integrated and taken care of by the hybrid computing apparatus 500, in one place. The system administrator is not given access to the processing units. This architecture makes it extremely convenient to provide, populate software updates and then to deploy them automatically.

Figure 10:
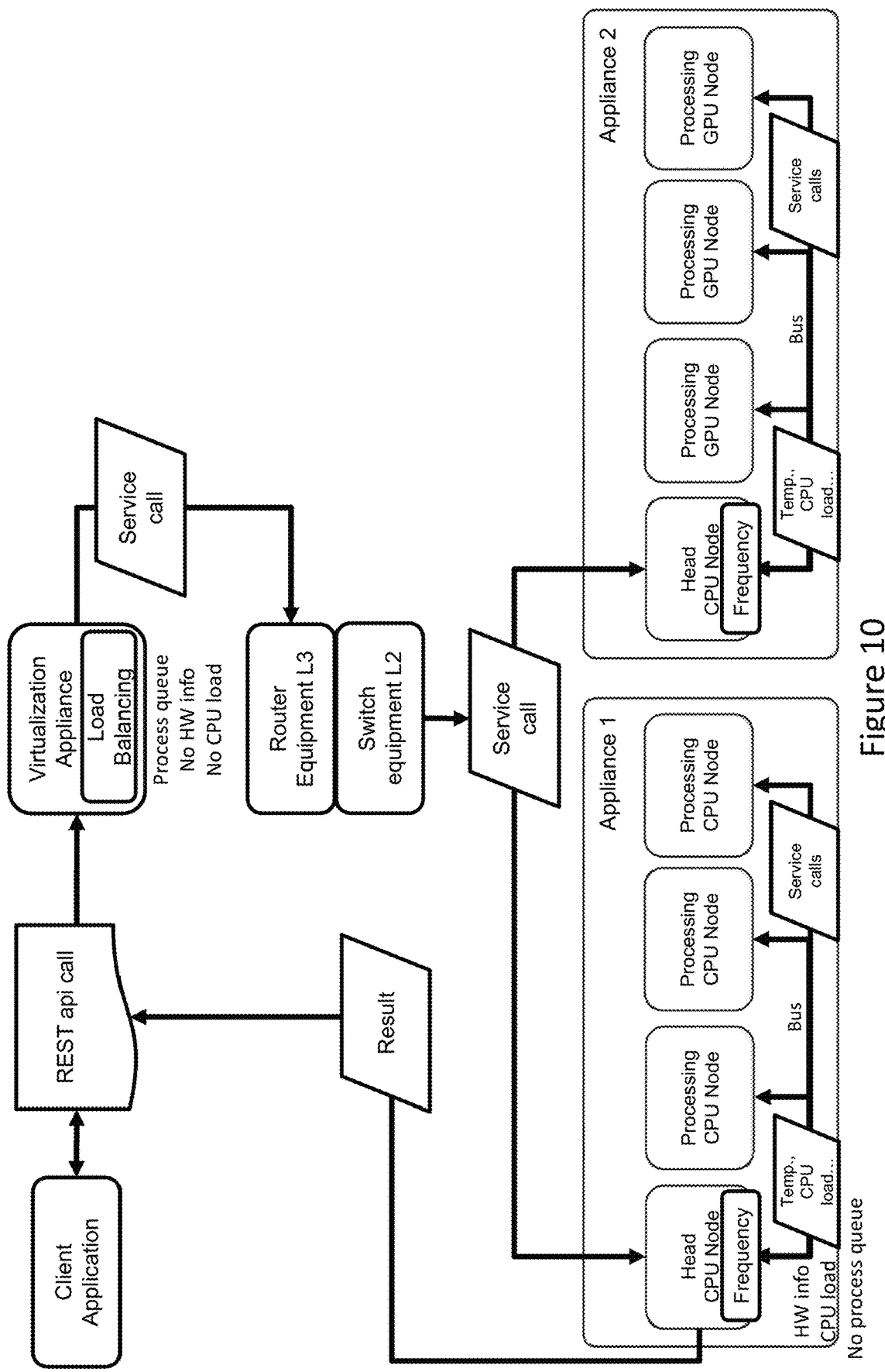
FIG. 10 is a modified flow diagram of FIG. 2 in which signaling related to performance monitoring, tuning and stability automation is added in accordance with an embodiment of the present technology.

FIG. 10 is a modified flow diagram of FIG. 2 in which signaling related to performance monitoring, tuning and stability automation is added in accordance with an embodiment of the present technology. Performance and stability monitoring is implemented at the level of the virtualization appliance in this architecture. The virtualization appliance may attempt to evenly distribute load (i.e. service calls) to the authorized processing units. However, the virtualization appliance cannot predict the amount of processing that will result from each service call. Indeed, the content of a data packet does not contain any logical information concerning the processor load or processing budget that would be required to process the data packet in the case of a virtualized task in any processing unit. In the event of overheating due to overload in a processing unit, its automatic mechanism will lower its operating frequency. The processing unit may continue in degraded mode to ensure the execution of its allocated service calls. Meanwhile, the load balancing function of the virtualization appliance is not informed of the temperature of the processing units and cannot factor these temperatures in its algorithms that attempt to track the load on each processing unit. As a result, there is a logical balancing process at the virtualization appliance level that may not be congruent with a physical balancing at the level of the processing units.

Figure 11:
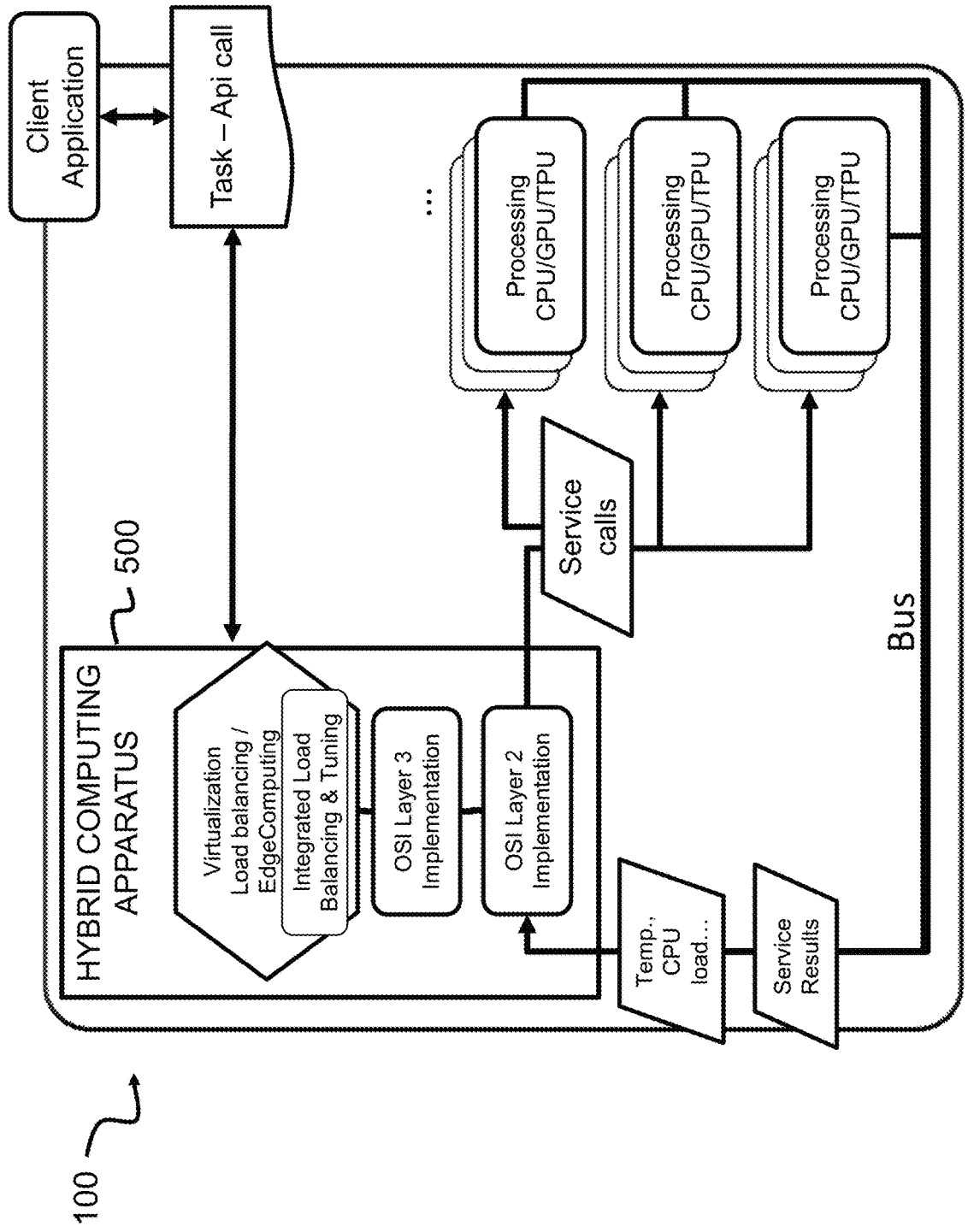
FIG. 11 illustrates an implementation of the signaling related to performance monitoring, tuning and stability automation of FIG. 10 into the computing architecture of FIG. 3 in accordance with an embodiment of the present technology.

FIG. 11 illustrates an implementation of the signaling related to performance monitoring, tuning and stability automation of FIG. 10 into the computing architecture of FIG. 3 in accordance with an embodiment of the present technology. Conventional load balancing algorithms are implemented in the virtualization module of the hybrid computing apparatus 500. Additional information including the temperature (for example processor temperatures) of the processing units, possibly including CPU loads, is received at the hybrid computing apparatus 500 from the processing units. The temperature values may be factored in the load balancing algorithms to provide a fine mechanism allowing to limit the load applied to a processing unit having reported a higher than normal temperature.

On FIG. 11, the temperature info is sent to the programmable component. Since both types of balancing are deployed in the same location, one can avoid ordering an overheated node to take on a new task. A priori, the virtualization unit cannot predict whether a task will generate a lot of processing on a node and cannot predict the duration of this load. This information being decorrelated, it is therefore possible to command a node already overheating a task which will worsen the situation. The new architecture helps prevent this problem. We know that a CPU/GPU/TPU already has a certain temperature and this information can be taken into account in load balancing. Then, finer mechanisms can unload a saturated temperature unit and redirect a task to a cooler unit. Note that the temperature data circulates on the same bus as the service results.

Figure 12:
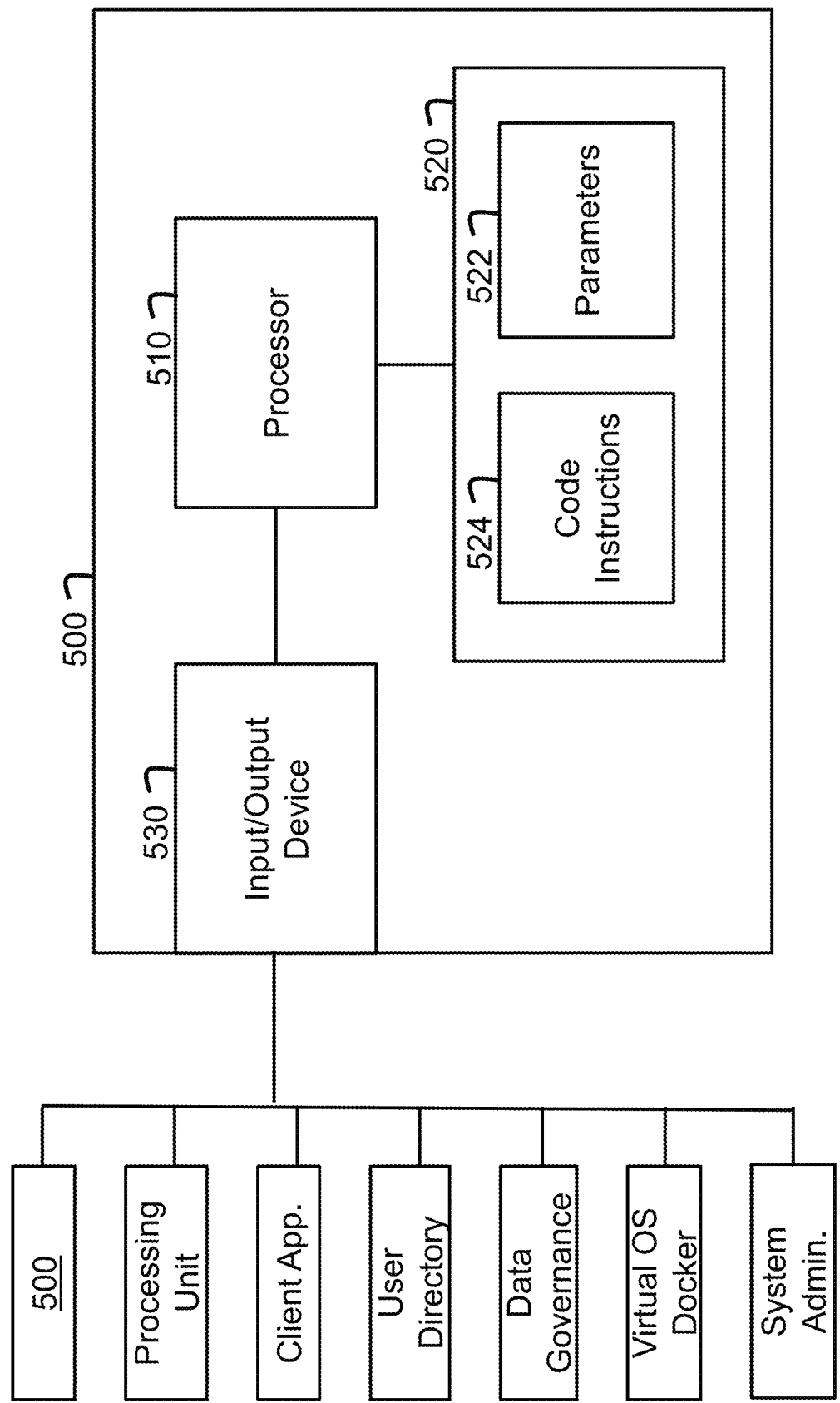
FIG. 12 is a schematic block diagram of the hybrid computing apparatus according to an embodiment of the present technology.

The operations performed by the hybrid computing apparatus 500 illustrated in FIGS. 3, 4, 7, 9 and 11 may be configured to be processed by one or more processors, the one or more processors being coupled to a memory device. For example, FIG. 12 is a schematic block diagram of the hybrid computing apparatus 500 according to an embodiment of the present technology. The hybrid computing apparatus 500 comprises a processor or a plurality of cooperating processors (represented as a processor 510 for simplicity), a memory device or a plurality of memory devices (represented as a memory device 520 for simplicity), and an input/output device or a plurality of input/output devices (represented as an input/output device 530 for simplicity). Separate input devices and output devices (not shown) may be present instead of the input/output device 530. The input/output device 530 incorporates both the layer 3 software-defined networking component and the layer 2 software-defined networking component. The input/output device 530 allows the hybrid computing apparatus 500 to communicate with another edge computing device 500, to one or more processing units, to a client application, to a user directory, to a data governance, to a virtual OS docker and/or to a system administrator.

The processor 510 is operatively connected to the memory device 520 and to the input/output device 530. The memory device 520 includes a storage 522 for storing parameters, including for example and without limitation the above-mentioned data governance information. The memory device 520 may comprise a non-transitory computer-readable medium 524 for storing instructions that are executable by the processor 510 to allow the hybrid computing apparatus 500 to perform the various tasks allocated to the hybrid computing apparatus 500 in any variant of the hybrid computing architecture 100. The combination of the processor 510 and of the memory device 520 may form an embodiment of the programmable component introduced hereinabove.

Various embodiments of the hybrid computing apparatus and of the hybrid computing architecture, as disclosed herein, may be envisioned. Non-limiting definitions that may apply to at least some of the embodiments of the present technology are introduced in the following paragraphs. Non-limiting embodiments of the present technology are then presented, until the conclusion of the present disclosure.

Definitions

Computer Appliance

A computer appliance is a computer with software or firmware that is specifically designed to provide a specific computing resource. Such devices became known as appliances because of the similarity in role or management to a home appliance, which are generally closed and sealed, and are not serviceable by the user or owner. The hardware and software are delivered as an integrated product and may even be pre-configured before delivery to a customer, to provide a turnkey solution for a particular application. Unlike general-purpose computers, appliances are generally not designed to allow the customers to change the software and the underlying operating system, or to flexibly reconfigure the hardware.

Computer System

A system of interconnected computers that share a central storage system and various peripheral devices such as a printers, scanners, or routers. Each computer connected to the system can operate independently, but has the ability to communicate with other external devices and computers.

Router

A router is a networking device that forwards data packets between computer networks. Routers perform the traffic directing functions on the Internet. Data sent through the internet, such as a web page or email, is in the form of data packets. A packet is typically forwarded from one router to another router through the networks that constitute an internetwork (e.g. the Internet) until it reaches its destination node.

Switch

A network switch (also called switching hub, bridging hub, officially MAC bridge) is networking hardware that connects devices on a computer network by using packet switching to receive and forward data to the destination device. A network switch is a multiport network bridge that uses MAC addresses to forward data at the data link layer (layer 2) of the OSI model. Some switches can also forward data at the network layer (layer 3) by additionally incorporating routing functionality. Such switches are commonly known as layer-3 switches or multilayer switches.

Hybrid Computing Apparatus

Figure 13:
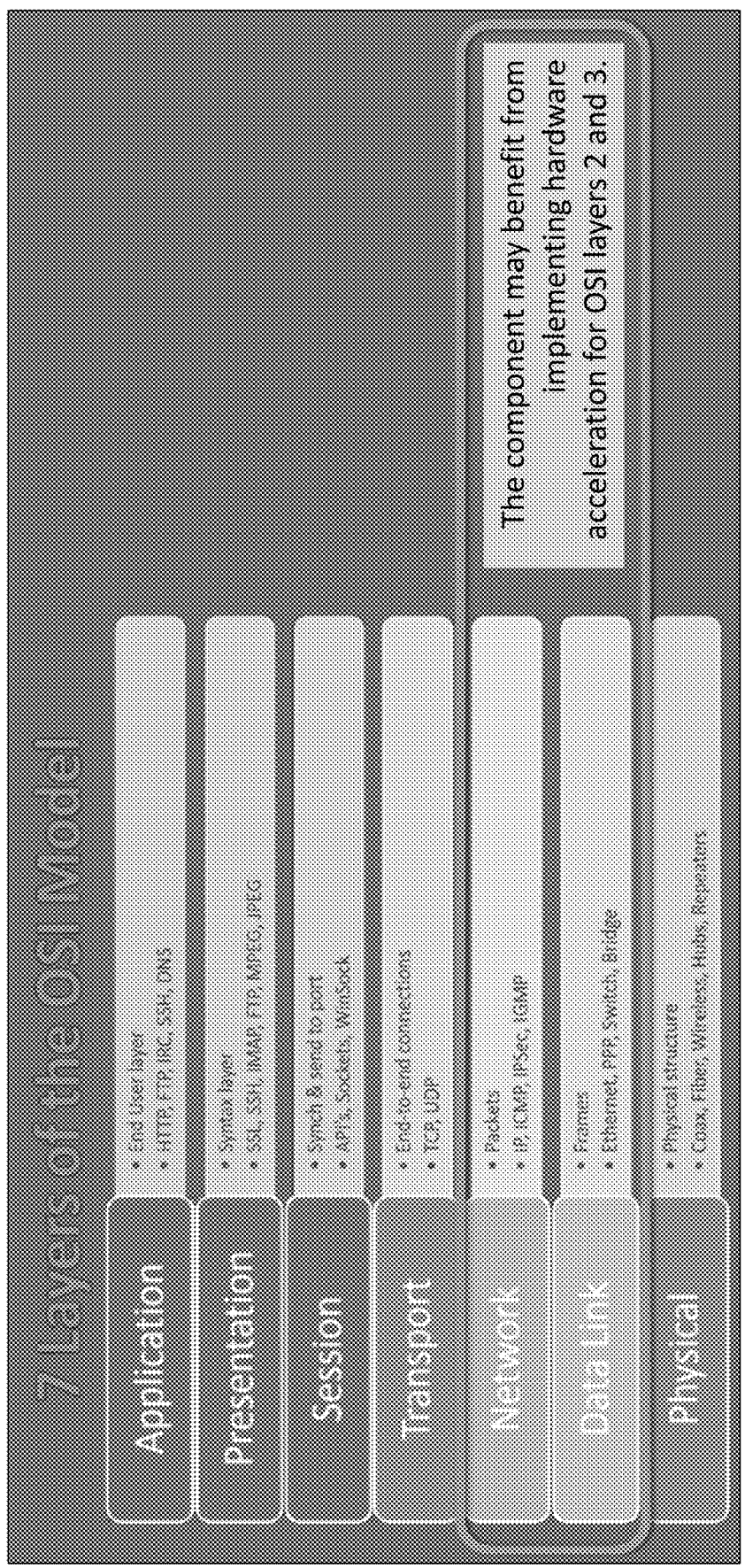
FIG. 13 depicts the OSI networking model and as applied to a hybrid computing apparatus according to an embodiment of the present technology.

FIG. 13 depicts the OSI networking model and as applied to a hybrid computing apparatus. The hybrid computing apparatus may be a hardware component supporting:

Operating system level programmability. As a non-limiting example, POSIX level programmability may be used (IEEE POSIX 2017).

Hardware and/or software implementation and hardware acceleration for OSI networking model layers 2 and 3.

Bus

Figure 14:
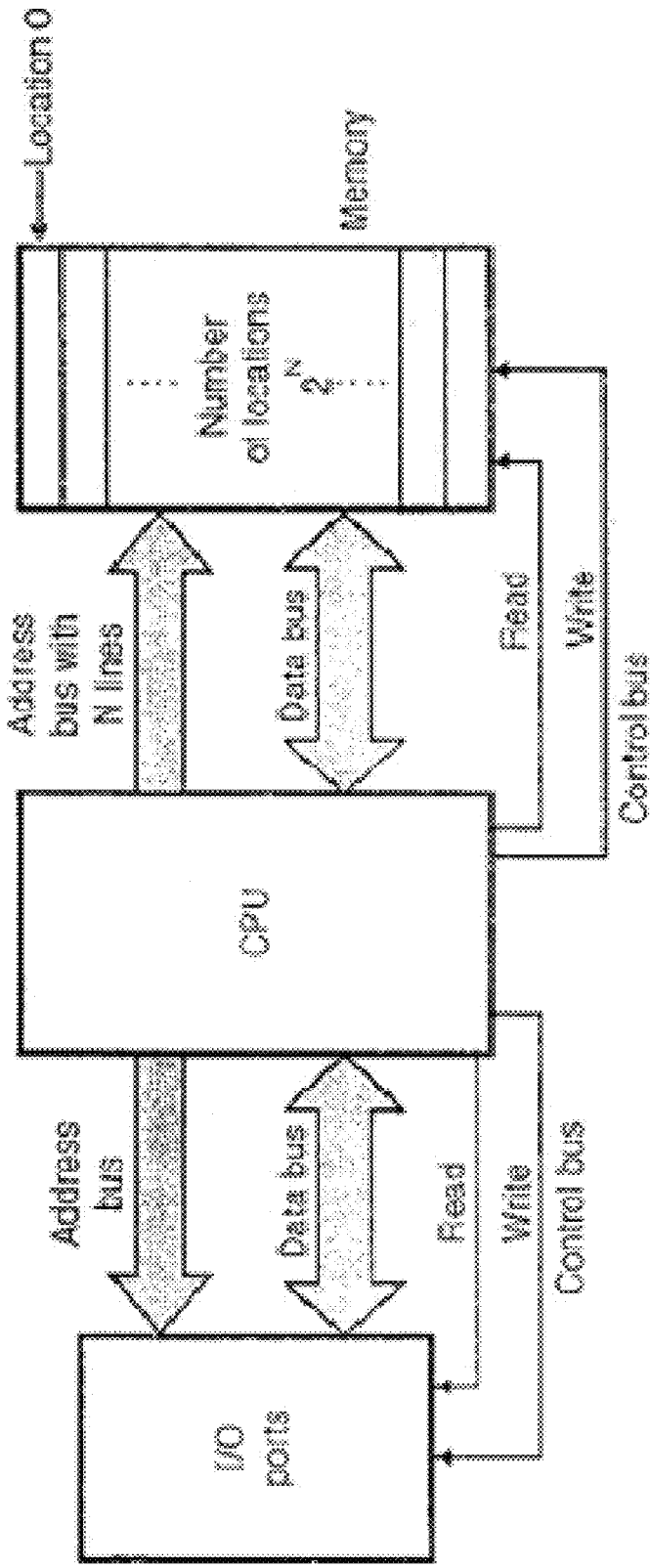
FIG. 14 illustrates three types of buses and their utility according to an embodiment of the present technology.

FIG. 14 illustrates three types of buses and their utility. In computer architecture, a bus (a contraction of the Latin omnibus) is a communication system that transfers data between components inside a computer, or between computers. This expression covers all related hardware components (wire, optical fiber, etc.) and software, including communication protocols. In the OSI network model, a bus may comprise a physical layer (layer 1) component and various data link layer, network layer and/or upper layers components. A computer architecture may for example include a data bus, a control bus and an address bus having any number of lines. CPUs and other processors, memory cards and input/output interfaces may all connect to any one of these buses.

Central Processing Unit

A central processing unit (CPU), also called a central processor or main processor, is the electronic circuitry within a computer that executes instructions that make up a computer program. The CPU performs basic arithmetic, logic, controlling, and input/output (I/O) operations specified by the instructions in the program.

Multi-Core Processor

Figure 15:
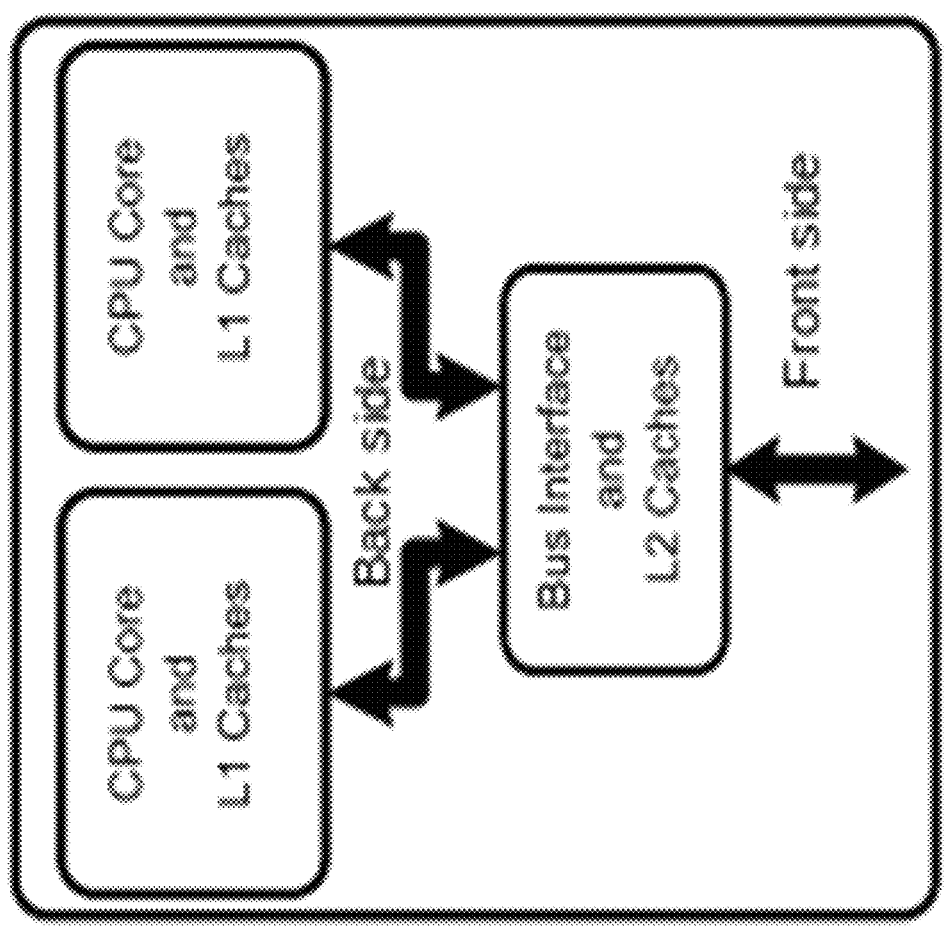
FIG. 15 is a block diagram of a multi-core processor according to an embodiment of the present technology.

FIG. 15 is a block diagram of a multi-core processor. A multi-core processor is a computer processor integrated circuit with two or more separate processing units, called cores, each of which reads and executes program instructions, as if the computer had several processors.

In a non-limiting embodiment, an Intel x86 architecture multi-core CPUs packaged in NUCs enclosures may be used. Other CPU types may also be used.

Graphics Processing Unit (GPU)

Figure 16:
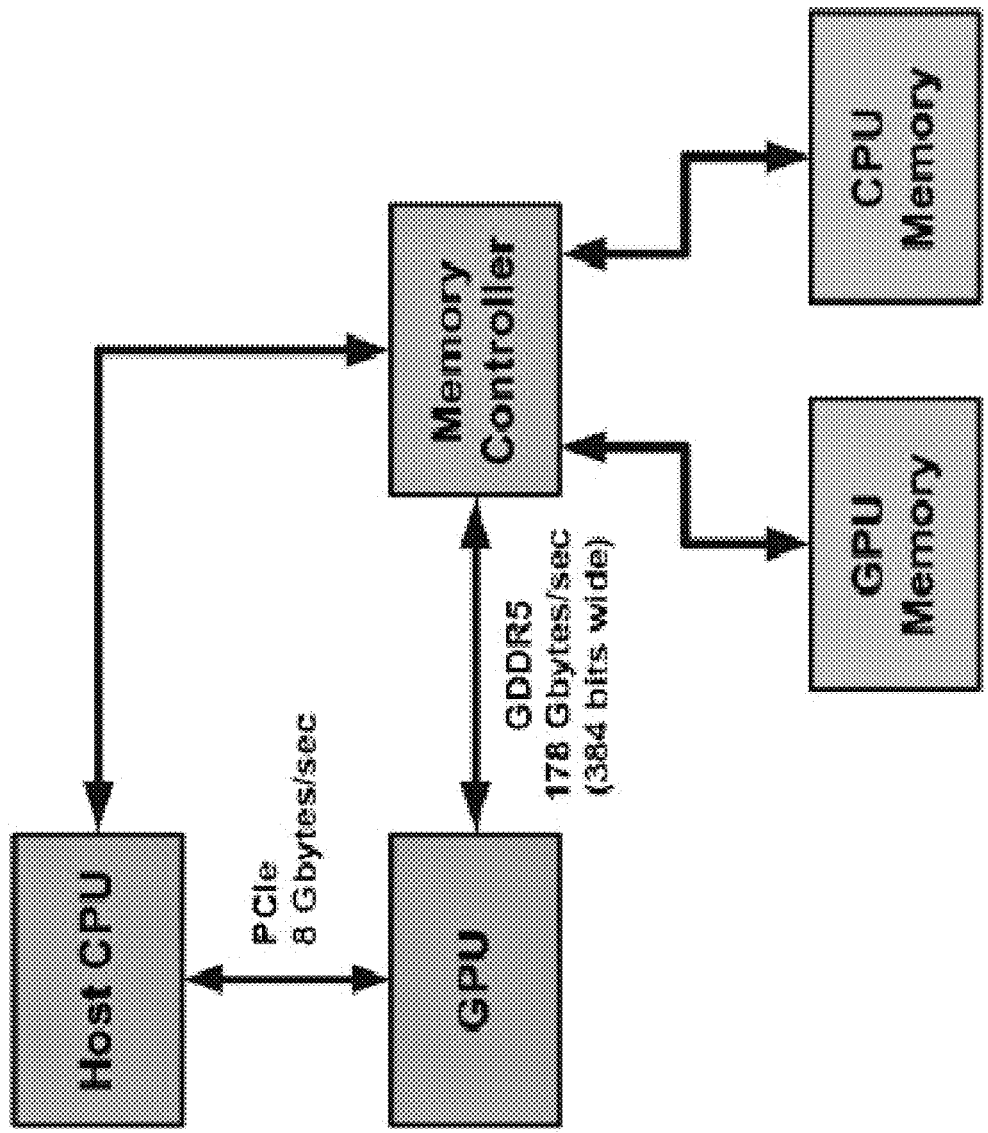
FIG. 16 depicts a Graphics Processing Unit principle according to an embodiment of the present technology.

FIG. 16 depicts a Graphics Processing Unit principle. A graphics processing unit (GPU) is a specialized electronic circuit designed to rapidly manipulate and alter memory to accelerate the creation of images in a frame buffer intended for output to a display device. Their highly parallel structure makes them more efficient than general-purpose central processing units (CPUs) for algorithms that process large blocks of data in parallel.

The present technology may, in a non-limiting embodiment, use Nvidia GPUs of the RTX (with a hosting CPU) and Jetson family (which embed their own CPU). However the present technology may apply to any GPU.

Tensor Processing Unit (TPU)

Figure 17:
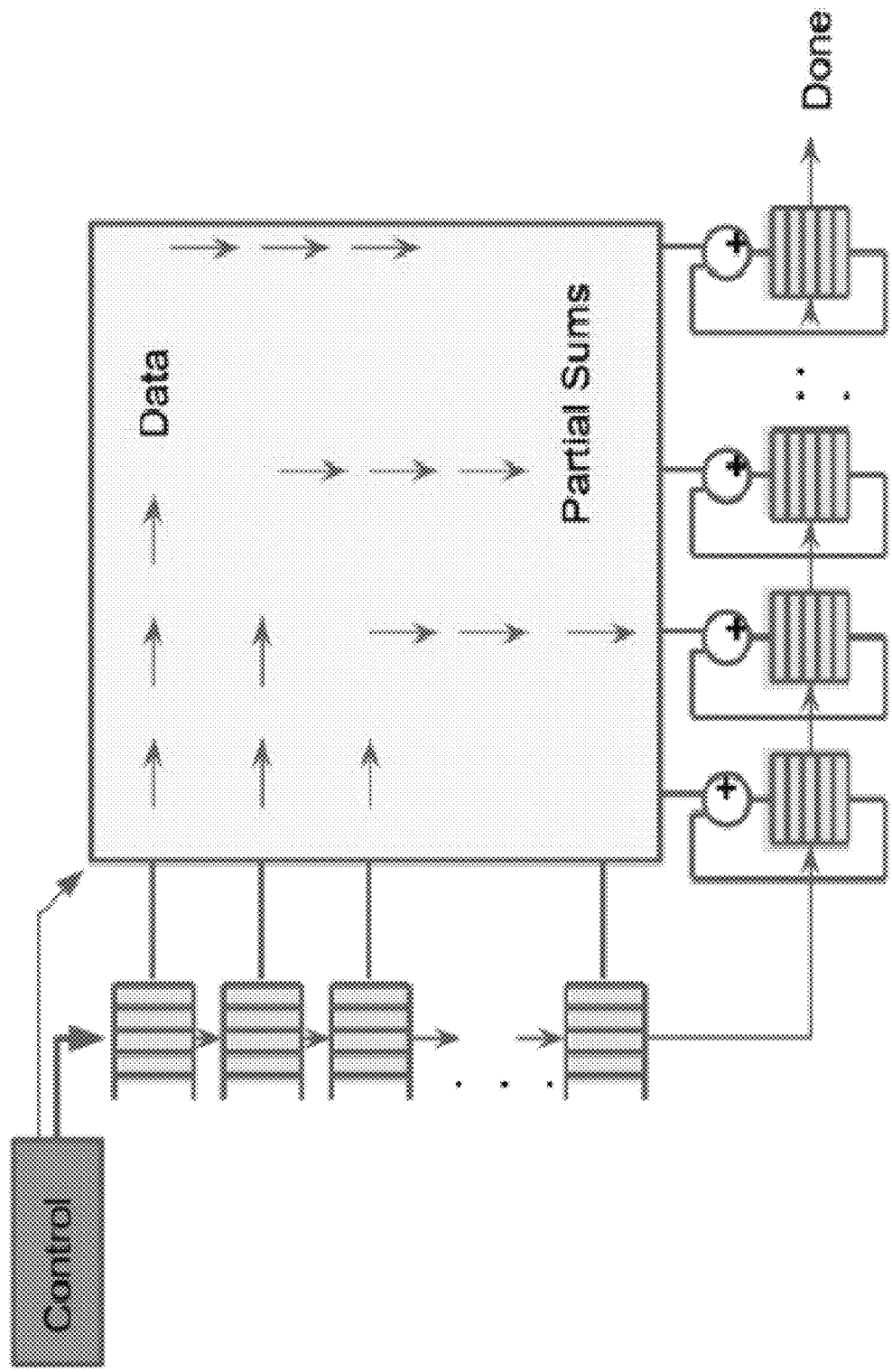
FIG. 17 depicts a Tensor Processing Unit principle according to an embodiment of the present technology.

FIG. 17 depicts a Tensor Processing Unit principle. A tensor processing unit (TPU) is an AI accelerator application-specific integrated circuit (ASIC) developed by Google specifically for neural network machine learning, particularly using Google's own TensorFlow software.

The present technology may, in a non-limiting embodiment, use Coral TPUs from Google, which have their own Hosting CPU. However the present technology may apply to any TPU.

Scalability

Scalability is the property of a system to handle a growing amount of work by adding resources to the system. In computing, scalability is a characteristic of computers, networks, algorithms, networking protocols, programs and applications. An example is a search engine, which supports increasing numbers of users, and the number of topics it indexes.

Data Protection/Information Privacy

Information privacy is the relationship between the collection and dissemination of data, technology, the public expectation of privacy, legal and political issues surrounding them. It is also known as data privacy or data protection. The fields of computer security, data security, and information security all design and use software, hardware, and human resources to address this issue.

Managed Services

Managed services is the practice of outsourcing the responsibility for maintaining, and anticipating need for, a range of processes and functions in order to improve operations and cut expenses.

Computer Hardware Tuning

Configuring and optimizing computer hardware performance, including modifications outside the manufacturer's specifications.

System Monitoring

A system monitor is a hardware or software component used to monitor system resources and performance in a computer system.

Service Virtualization

Service virtualization: emulating the behavior of specific components in heterogeneous component-based applications such as API-driven applications, cloud-based applications and service-oriented architectures.

Edge Computing

Edge computing is a distributed computing paradigm that brings computation and data storage closer to the location where it is desired, to improve response times and save bandwidth.

Fog Computing

Fog computing or fog networking, also known as fogging, is an architecture that uses edge devices to carry out a substantial amount of computation, storage, and communication locally and routed over the internet backbone.

Hardware Acceleration

In computing, hardware acceleration is the use of computer hardware specially made to perform some functions more efficiently than is possible in software running on a general-purpose central processing unit (CPU). Any transformation of data or routine that can be computed, can be calculated purely in software running on a generic CPU, purely in custom-made hardware, or in some mix of both. An operation can be computed faster in application-specific hardware designed or programmed to compute the operation than specified in software and performed on a general-purpose computer processor. Each approach has advantages and disadvantages. The implementation of computing tasks in hardware to decrease latency and increase throughput is known as hardware acceleration.

Software-Defined Network

Software-defined networking (SDN) technology is an approach to network management that enables dynamic, programmatically efficient network configuration in order to improve network performance and monitoring, making it more like cloud computing than traditional network management. SDN is meant to address the fact that the static architecture of traditional networks is decentralized and complex while current networks require more flexibility and easy troubleshooting. SDN attempts to centralize network intelligence in one network component by disassociating the forwarding process of network packets (data plane) (Corresponding to OSI Layer 2 and lower) from the routing process (control plane) (Corresponding to OSI Layer 3).

Network Functions Virtualization

Network functions virtualization (also network function virtualization or NFV) is a network architecture concept that uses the technologies of IT virtualization to virtualize entire classes of network node functions into building blocks that may connect, or chain together, to create communication services. NFV relies upon, but differs from, traditional server-virtualization techniques, such as those used in enterprise IT.

Virtualized Network Function (VNF)

A virtualized network function, or VNF, may consist of one or more virtual machines or containers running different software and processes, on top of standard high-volume servers, switches and storage devices, or even cloud computing infrastructure, instead of having custom hardware appliances for each network function.

For example, a virtual session border controller could be deployed to protect a network without the typical cost and complexity of obtaining and installing physical network protection units. Other examples of NFV include virtualized load balancers, firewalls, intrusion detection devices and WAN accelerators.

Docker

Docker is a set of platform as a service (PaaS) products that use OS-level virtualization to deliver software in packages called containers. Containers are isolated from one another and bundle their own software, libraries and configuration files; they can communicate with each other through well-defined channels. Because all of the containers share the services of a single operating system kernel, they use fewer resources than virtual machines.

Scope of the Present Technology

Figure 18:
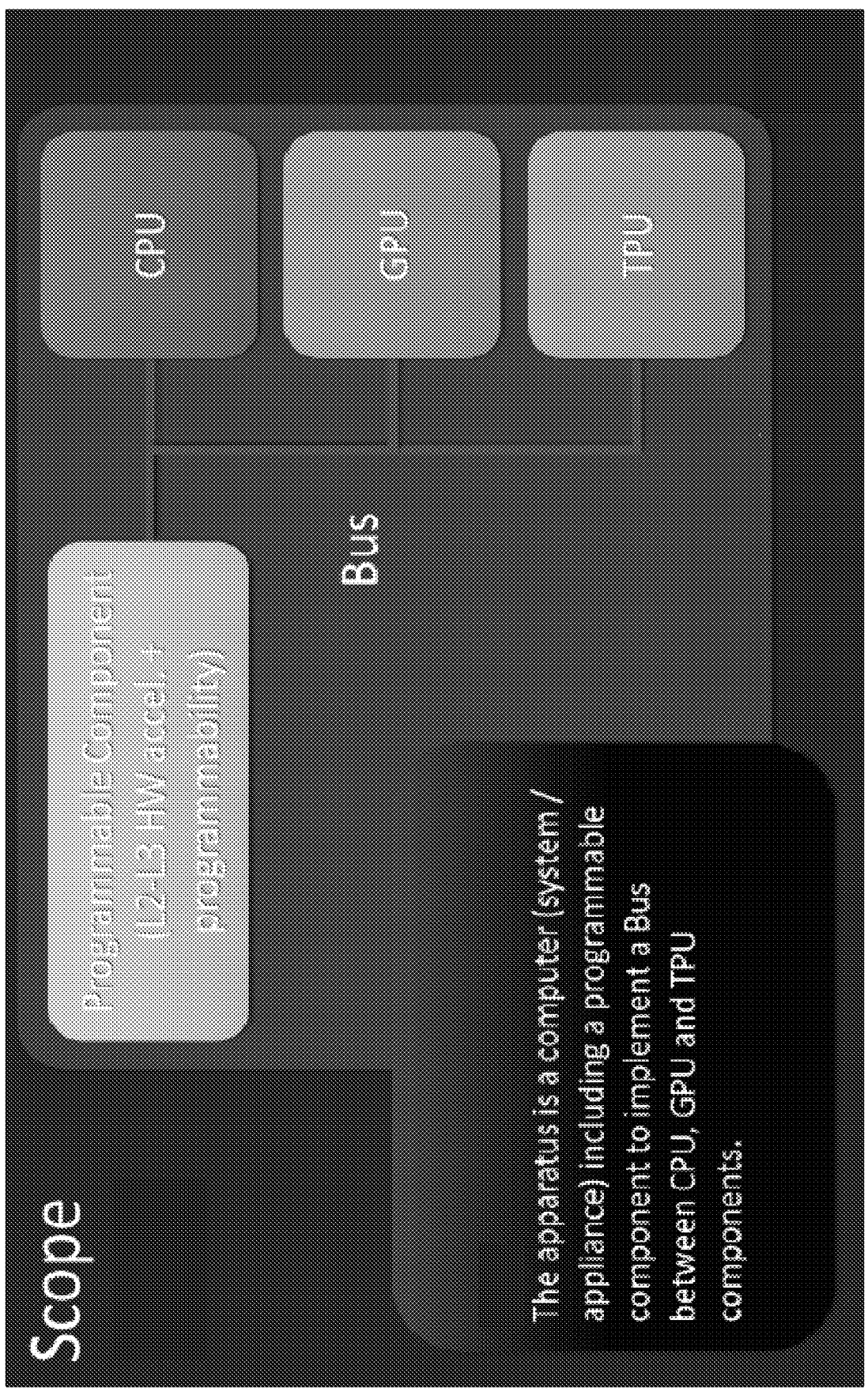
FIG. 18 illustrates a general scope according to an embodiment of the present technology.

FIG. 18 illustrates a general scope of an embodiment of the present technology. The apparatus is a computer (system/appliance) including a programmable component to implement a Bus between the programmable component and one or more CPU, GPU/or and TPU components that provide computing capacity to handle tasks for client applications.

Specific Characteristics

Nonfunctional characteristics may play a role (Form factor, destination, etc. . . . )

The computer (system/appliance) may be a given desired enclosure having a given type of form factor constraints enclosure.

The hybrid computing apparatus may implement L2-L3 hardware acceleration and POSIX programmability.

Purposes

Performance and Stability Automation (System Monitoring and Computer Hardware Tuning).

Managed Services Rationalization.

Information Security and Data Protection.

Virtualization & Scalability, including:

Virtualization & Edge/Fog computing

Scalability & Load Balancing

Purpose 1—Performance and Stability Automation (Computer Hardware Tuning and System Monitoring)

Conventional Performance and Stability Automation

Figure 19:
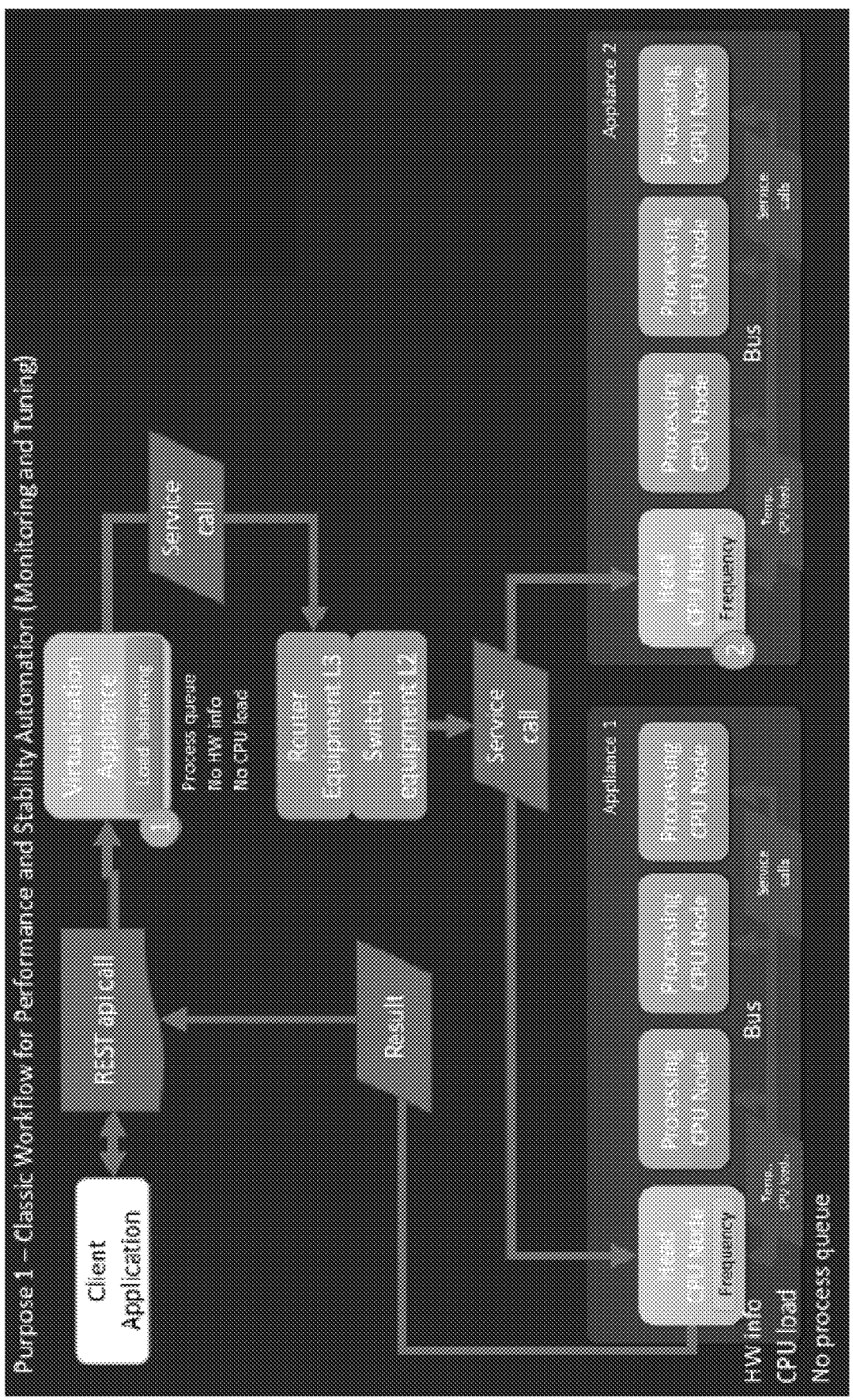
FIG. 19 illustrates a classic workflow for performance and stability automation.

FIG. 19 illustrates a classic workflow for performance and stability automation.

General Principles

Through the bus, the hybrid computing apparatus can centralize information, namely each unit computation load, frequency configuration and temperature.

This layout enables, within the Computer Appliance, to:
Tune each unit's frequency with respect to its temperature and load.
Tune each unit's workload (Load balancing) with respect to its temperature and frequency.

Performance and Stability Automation Diagram

Figure 20:
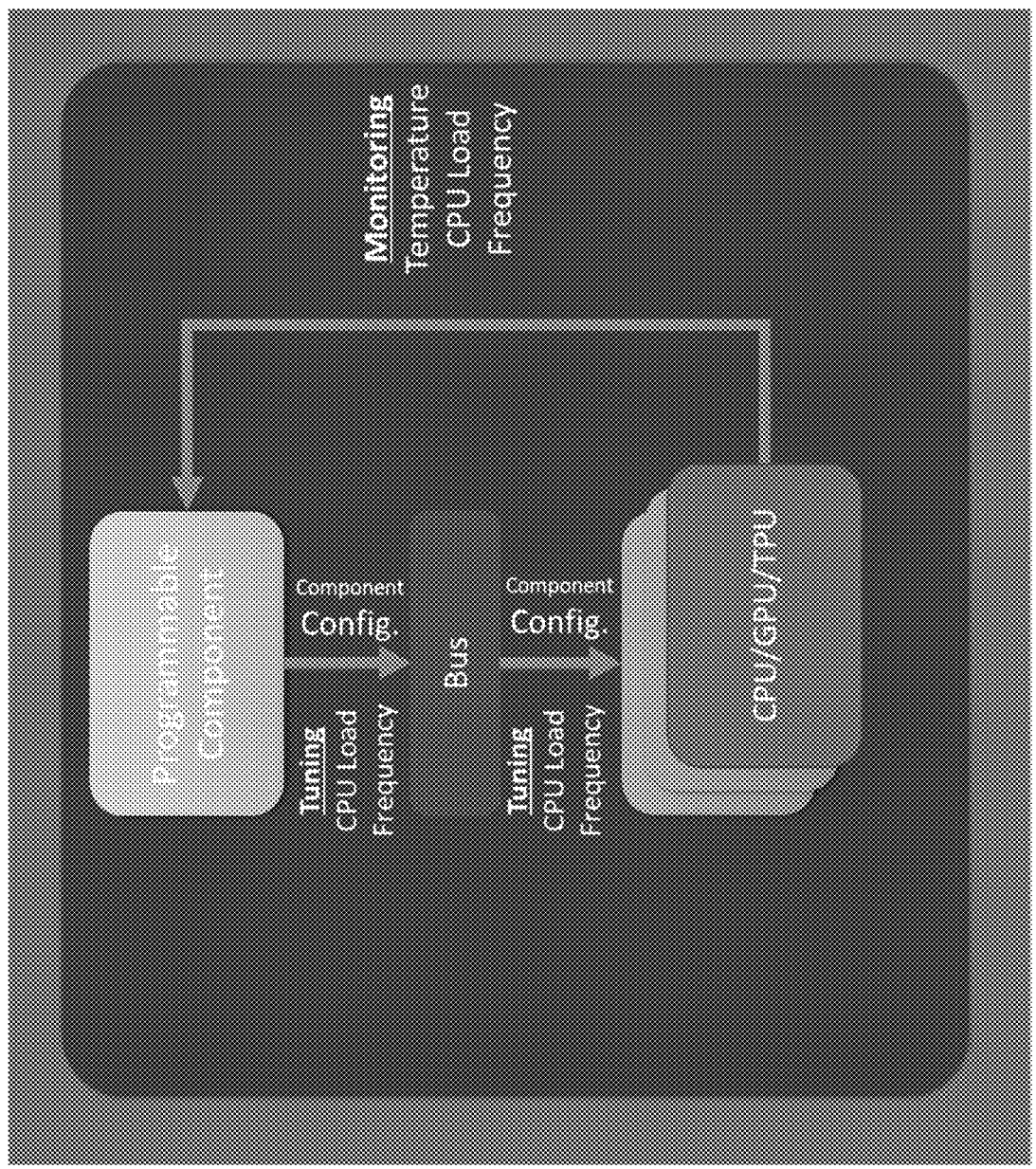
FIG. 20 is a Performance and Stability Automation Diagram according to an embodiment of the present technology.

FIG. 20 is a Performance and Stability Automation Diagram.

Figure 21:
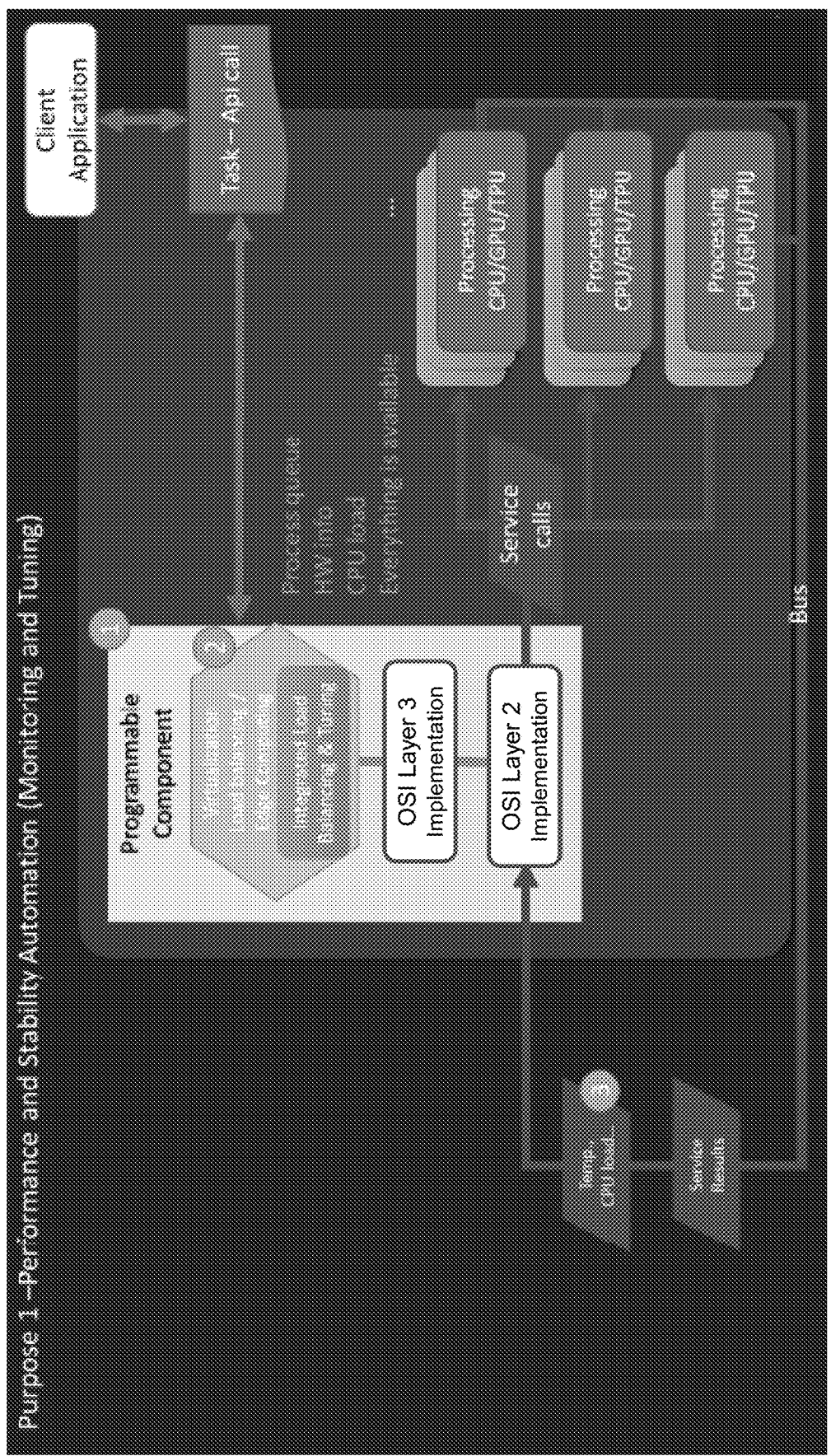
FIG. 21 is a Performance and Stability Automation Workflow according to an embodiment of the present technology.

FIG. 21 is a Performance and Stability Automation Workflow.

Purpose 2—Managed Services Rationalization

Conventional Managed Services

Figure 22:
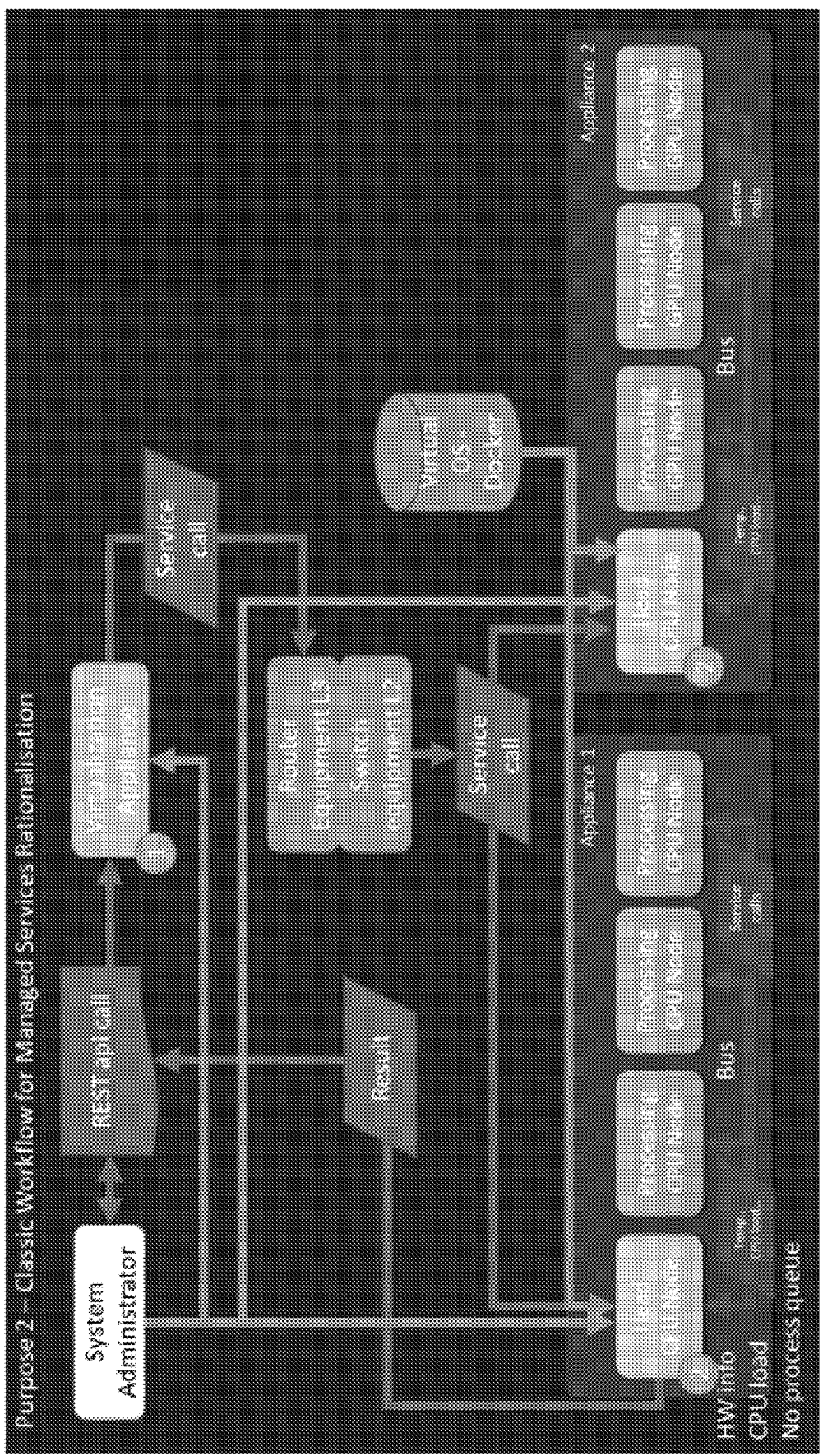
FIG. 22 illustrates conventional Managed Services.

FIG. 22 illustrates conventional Managed Services.

General Principles

Figure 23:
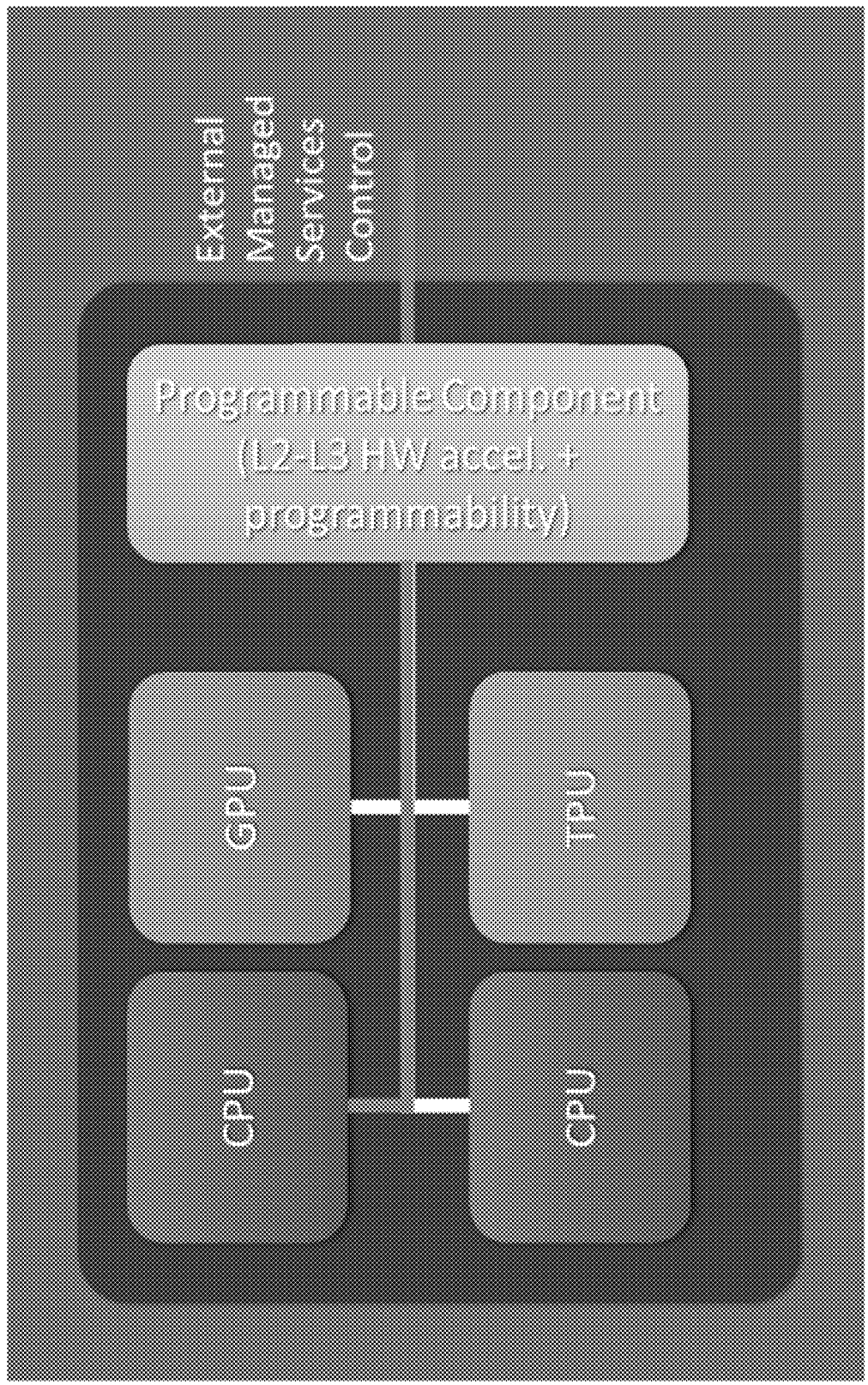
FIG. 23 illustrates Managed Services Rationalization General Principles according to an embodiment of the present technology.

FIG. 23 illustrates Managed Services Rationalization General Principles. The programmable component of the hybrid computing apparatus enables a secure access to a limited API or Web UI, taking charge of implementing the actual managed services operations.

Figure 24:
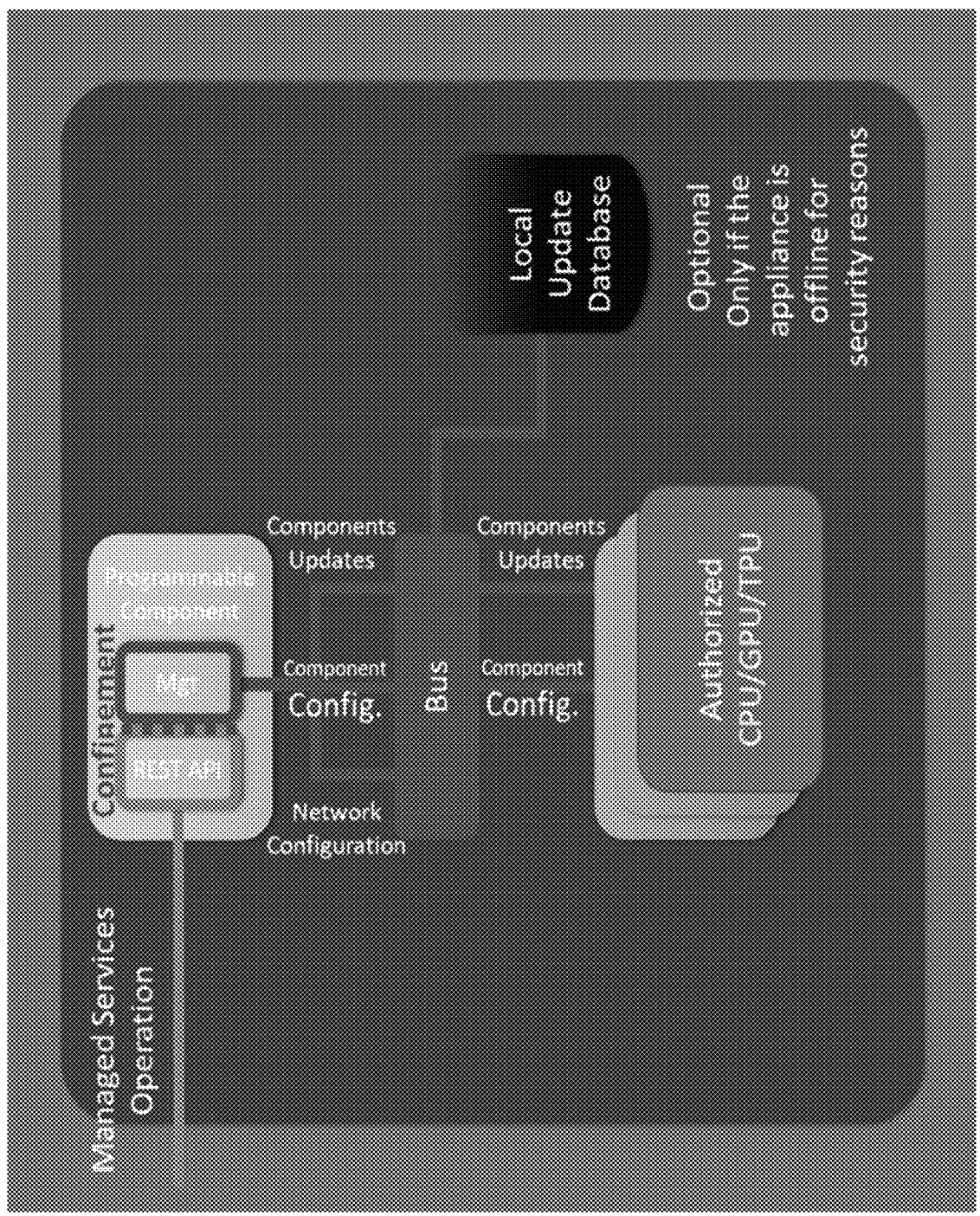
FIG. 24 is a Managed Services Workflow according to an embodiment of the present technology.

This layout enables, within the Computer Appliance, to:
Rationalize Managed Services costs
Protect data and processes internal to the appliance, on a cybersecurity level Managed Services Workflow FIG. 24 is a Managed Services Workflow.

Figure 25:
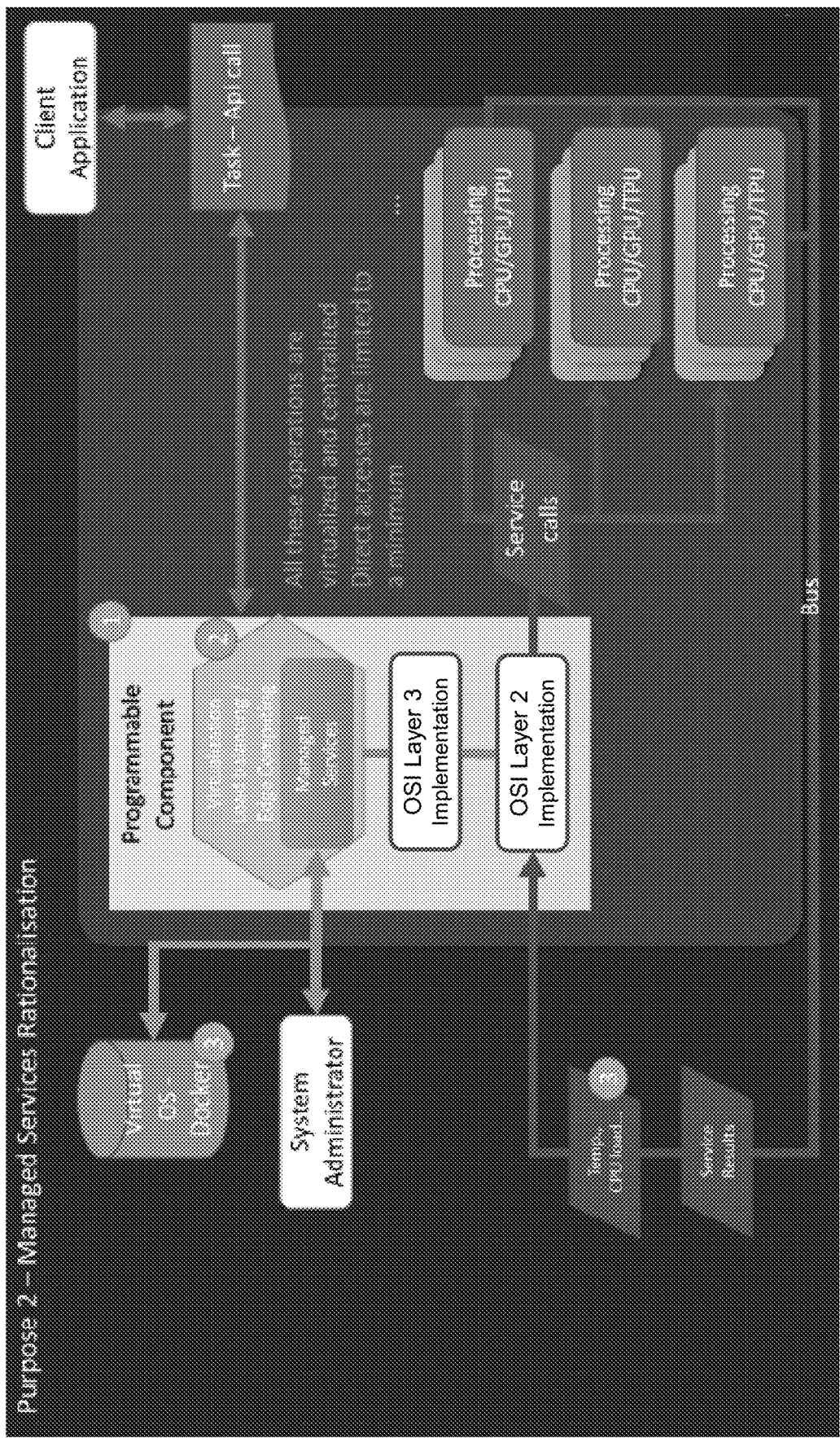
FIG. 25 illustrates Managed Services Rationalization for one Appliance according to an embodiment of the present technology.

FIG. 25 illustrates Managed Services Rationalization for one Appliance.

Figure 26:
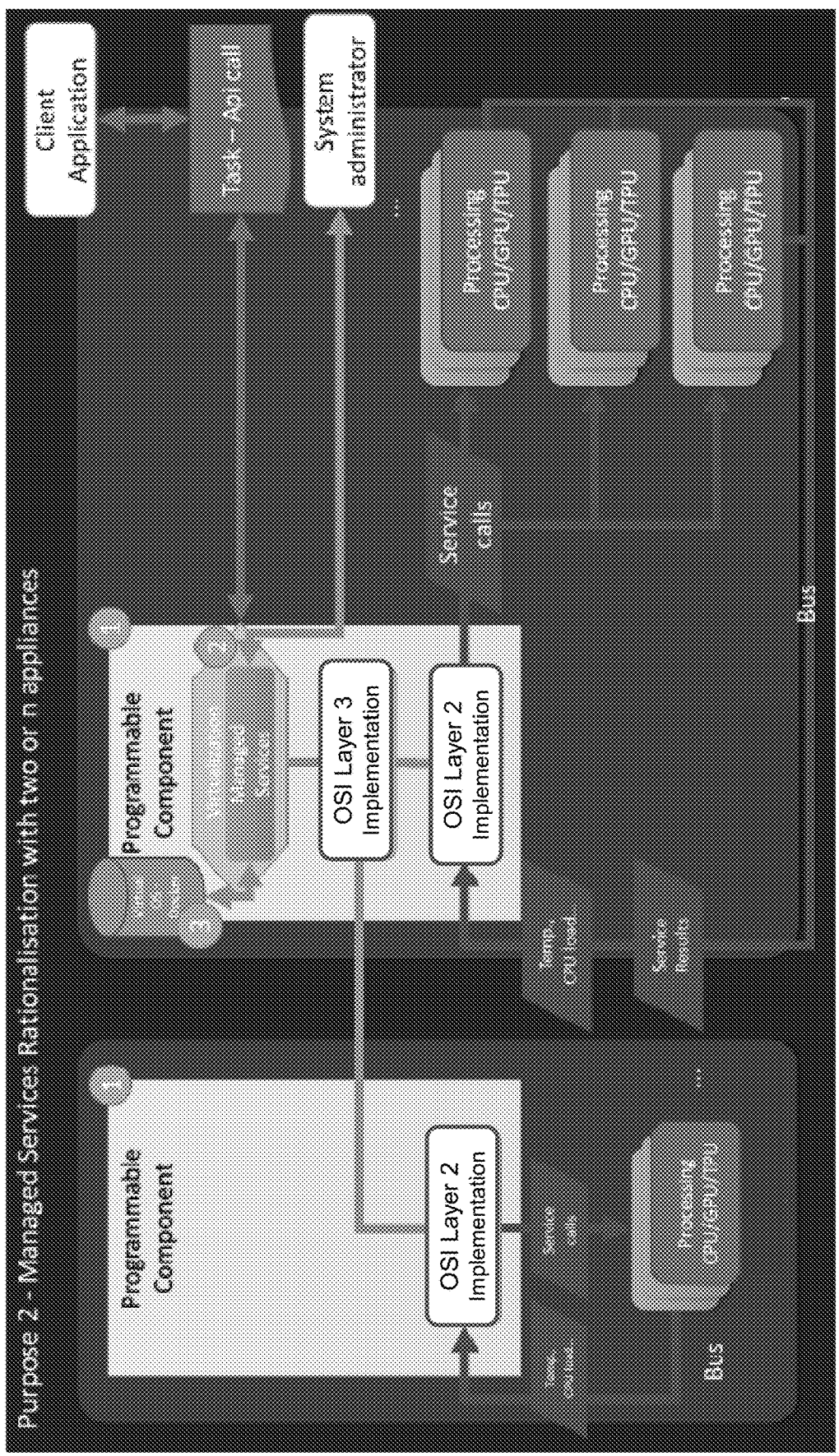
FIG. 26 illustrates Managed Services Rationalization with two or n appliances according to an embodiment of the present technology.

FIG. 26 illustrates Managed Services Rationalization with two or n appliances.

Purpose 3—Information Privacy/Data Protection

Conventional Approach for Information Privacy/Data Protection

Figure 27:
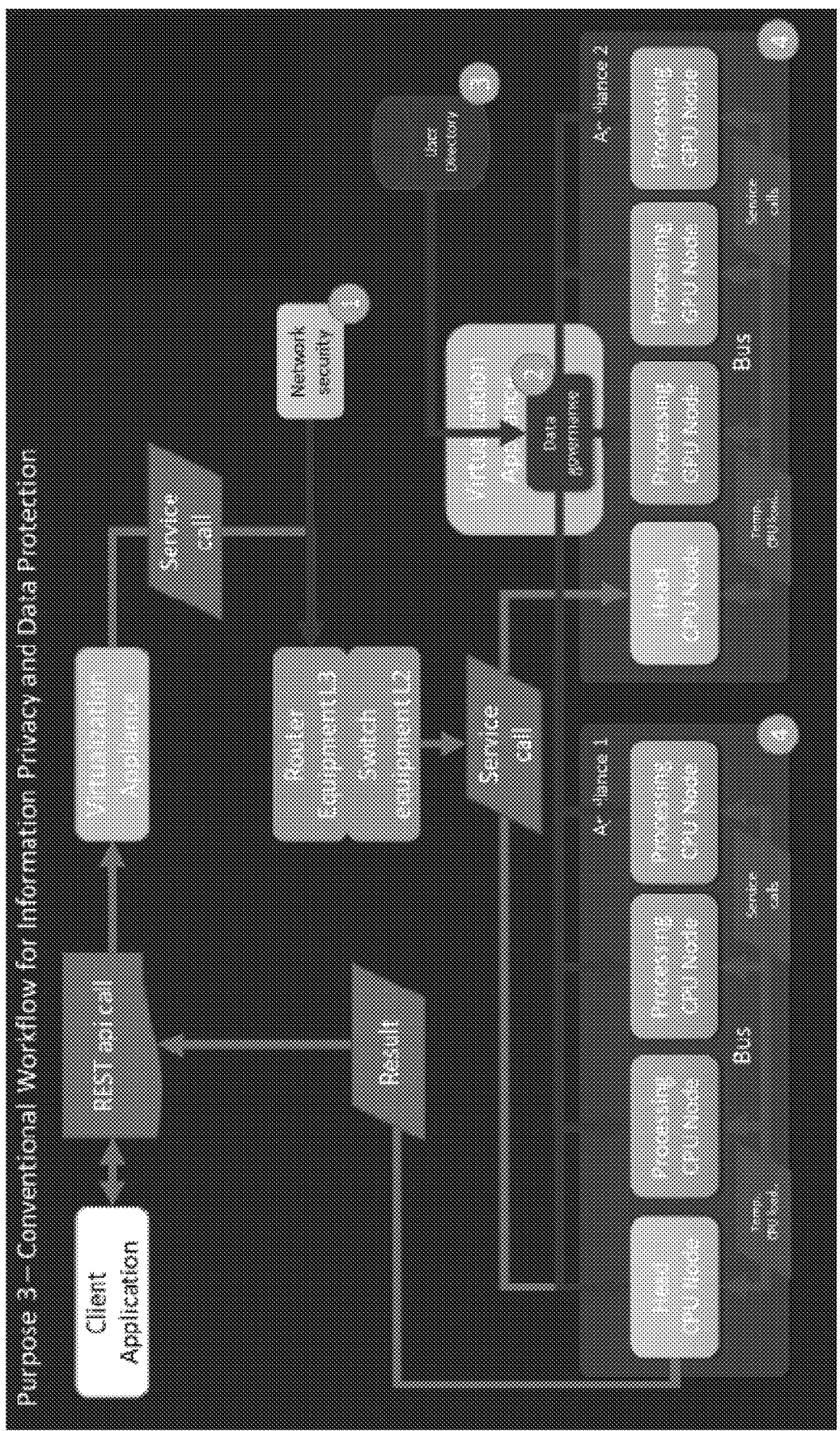
FIG. 27 is a conventional approach for Information Privacy/Data Protection.

FIG. 27 is a Conventional approach for Information Privacy/Data Protection.

General Principles

Figure 28:
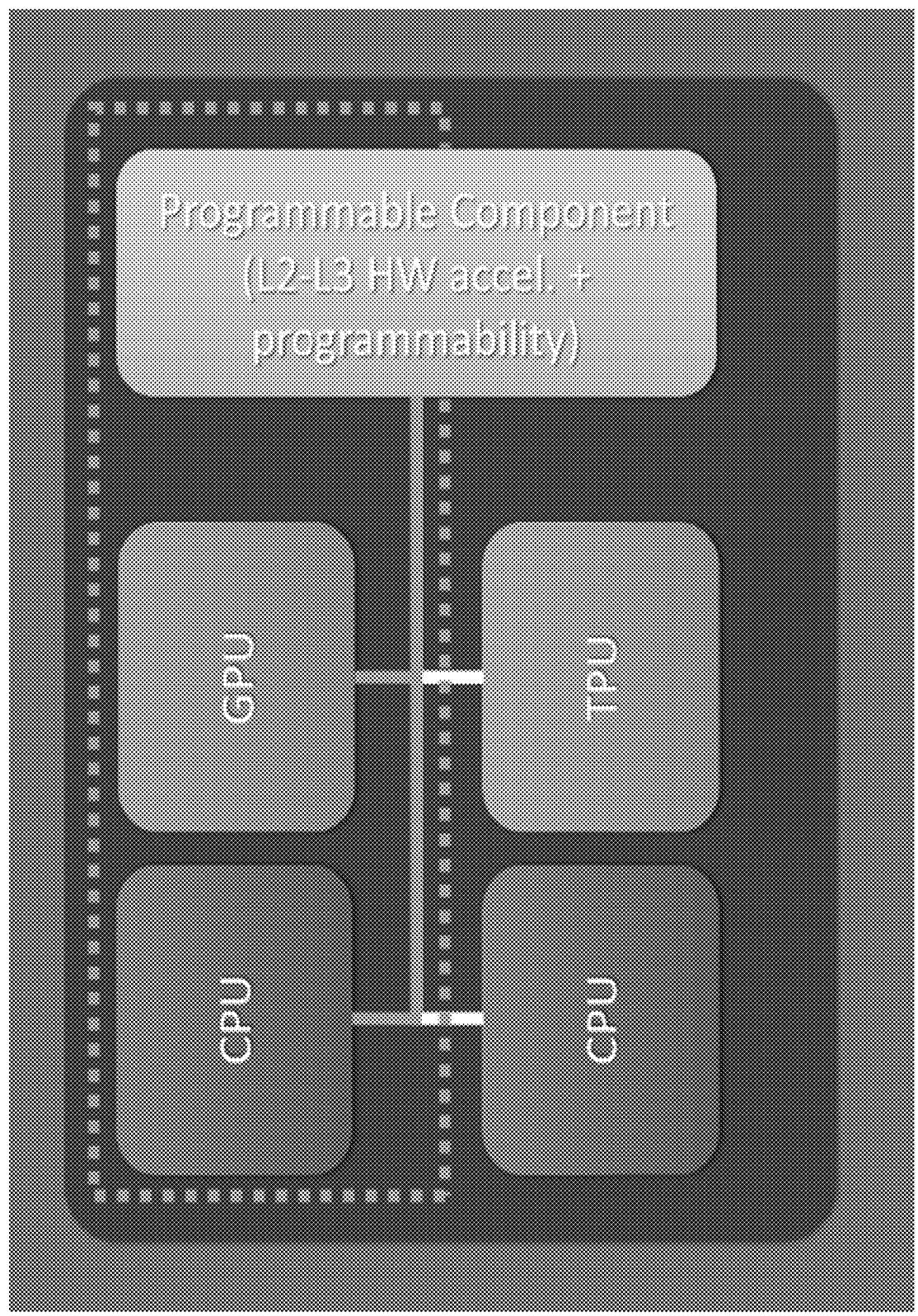
FIG. 28 illustrates Information Privacy/Data Protection General Principles according to an embodiment of the present technology.

FIG. 28 illustrates Information Privacy/Data Protection General Principles. Virtual Sub Network is at the L3 OSI level in the internal appliance bus.

Data processed within the Sub Network is not visible to the other computing units (CPU, GPU, TPU)

Implemented by hardware L2&L3 support, this virtual segmentation of the bus:
doesn't introduce performance deficits; and
is more robust and less vulnerable for cybersecurity considerations.

It may be noted that the embodiment of FIG. 28 introduces an additional, robust layer of data security based on L3 features.

It does not replace other practices of data protection/cybersecurity such as SoC/SIEM (Network wide practices) or Operating System Hardening (Appliance Specific, Operating System Level practices)

Information Security/Data Protection Topology Diagram

Figure 29:
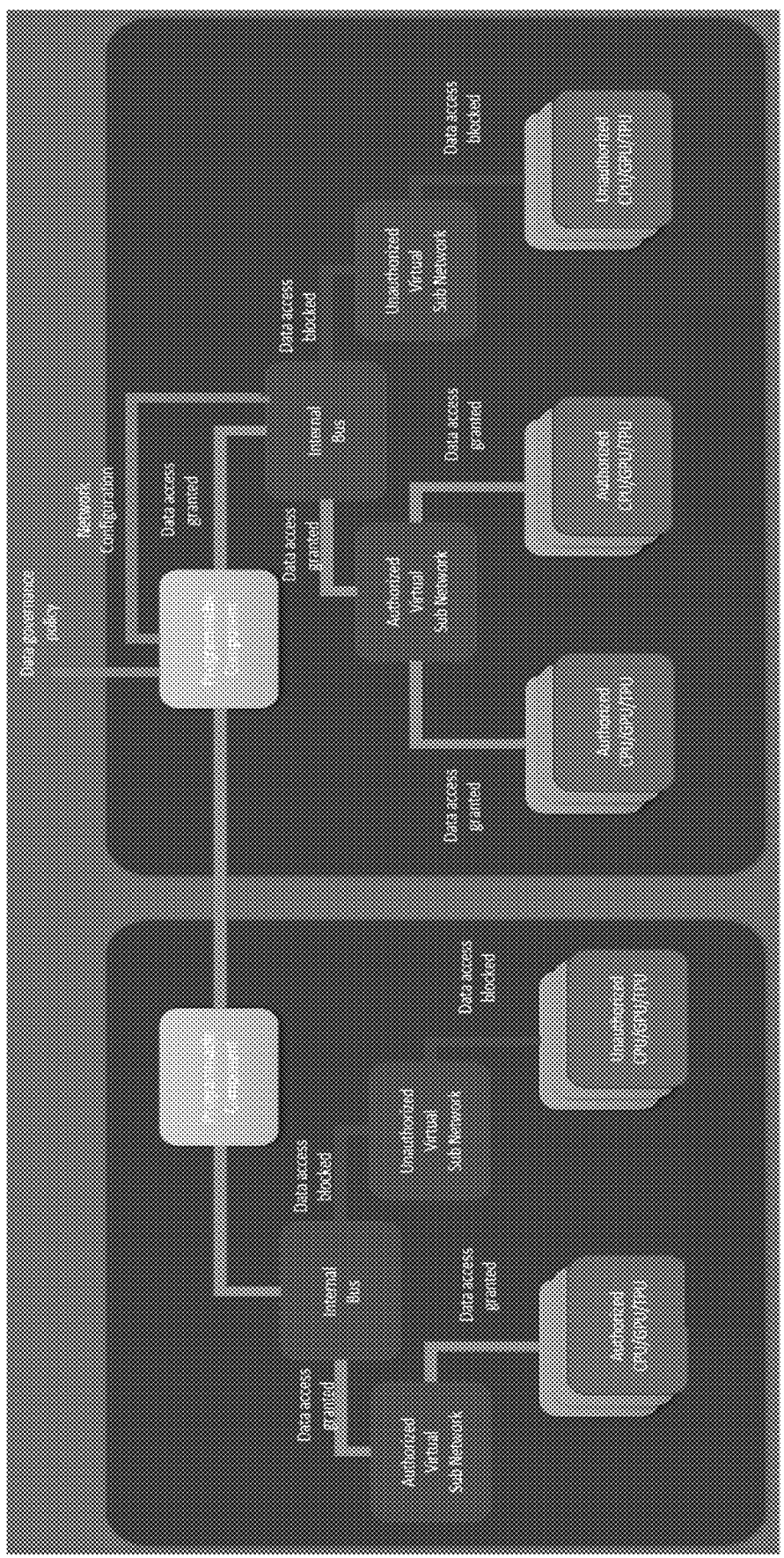
FIG. 29 is an Information Security/Data Protection Topology Diagram according to an embodiment of the present technology.

FIG. 29 is an Information Security/Data Protection Topology Diagram.

Figure 30:
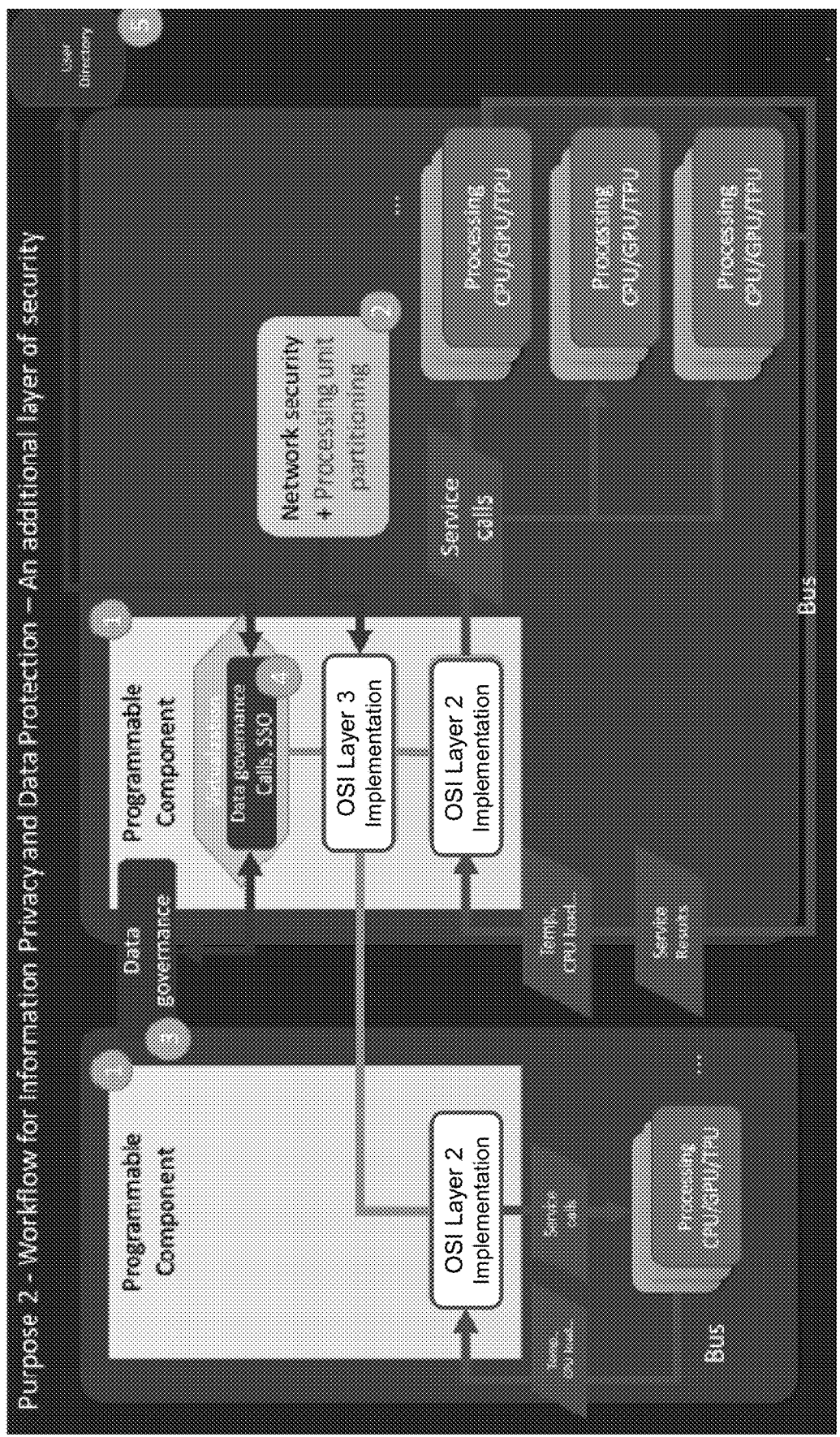
FIG. 30 is a Workflow of Information Privacy and Data Protection according to an embodiment of the present technology.

FIG. 30 is a Workflow of Information Privacy and Data Protection.

Purpose 4—Service Virtualization and Scalability

Conventional Scalability Model for a Service Virtualization Use Case

Figure 31:
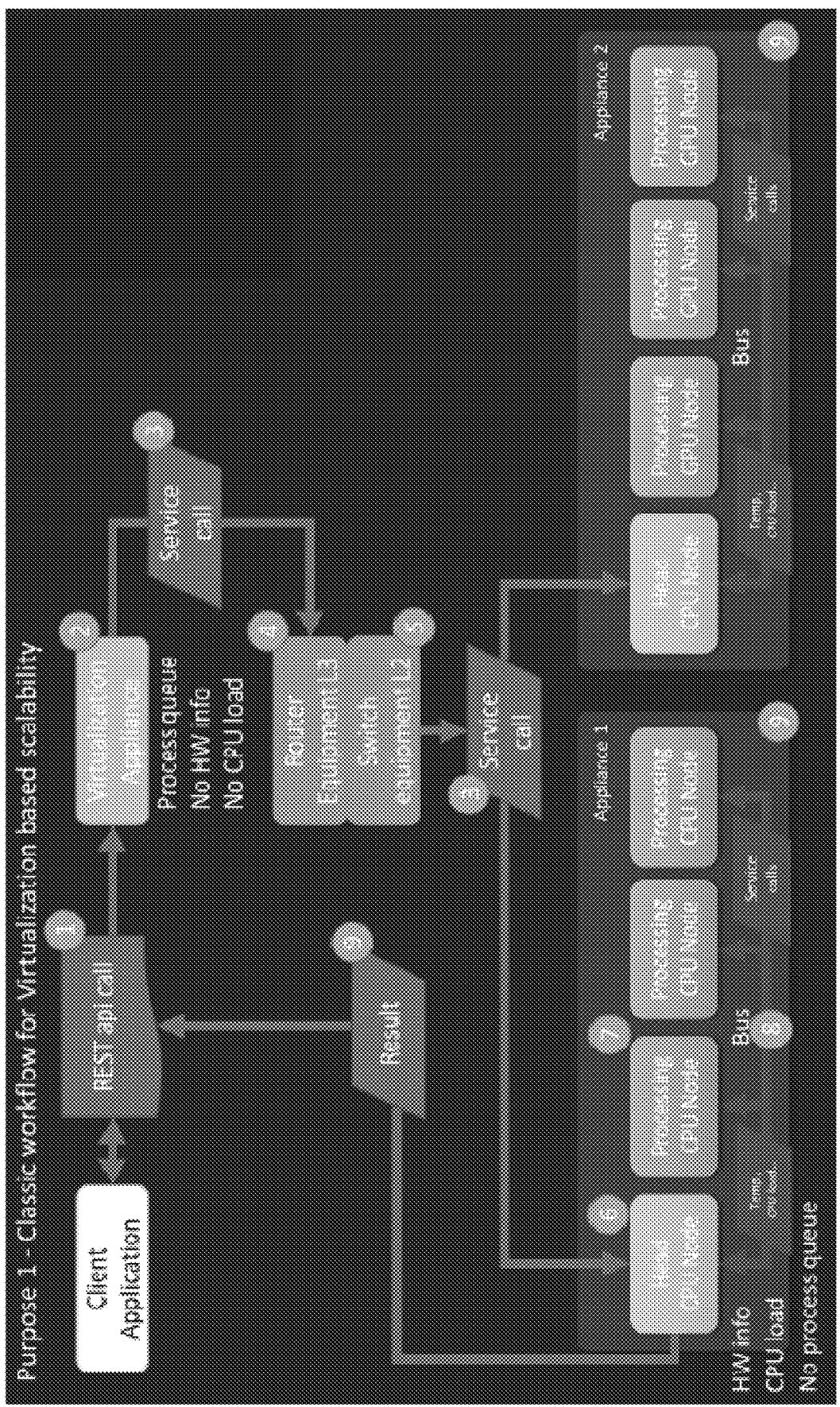
FIG. 31 is a conventional scalability workflow for a service virtualization use.

FIG. 31 is a conventional scalability workflow for a service virtualization use case.

1. The system receives a REST user request call from the virtualized services API.
2. It is handled by the appliance in charge of providing virtualized services, which translates this call to a virtual service into a service call (3) assigned to an appliance N (9) based on coarse grain information (Process queue essentially).
3. The service call assigned to an N appliance (9) is then communicated by the appliance in charge of providing virtualized services to that appliance N (9).
4. The service call is routed by a router-type network equipment (OSI level 3) to this N appliance (9).
5. The service call is transferred by a switch-type network equipment (OSI level 2), which may or may not packaged with (4), to this N appliance (9).
6. The service call reaches the Head CPU Node of the appliance N which allocates the request to the Processing CPU Node, without the coarse grain information (Process Queue) but possibly with System Monitoring Level information. It is worth mentioning that attributing workloads depending on process queue first then system monitoring information second is not the same as attributing workloads depending on process queue AND system monitoring information at the same time.
7. The service call reaches the Processing CPU Node of the appliance N through the appliance's bus (8)
8. The appliance N's bus redirects the result of the calculation to the Head CPU Node (6)
9. The appliance N returns the result of the calculation in return for the virtual service for the customer (It may be noted that the arrow in (9) is simplified for readability purposes, in effect it will go through 5, 4 and 2).

Form Factor and Power Consumption Considerations

It may be noted that in such a workflow, conventionally, the system will be implemented by the mutualization of 3+n hardware devices (1+n appliances, 2 networking components), each of these components occupying typically a space between 1 and 2 U (Unit of hardware occupation in rackable computing environment) with networking components having power consumption anywhere between 30 and 60 W and appliances consuming anywhere between 500 W and more than a KW, For one computation appliance topology, the indicative general power consumption is at a minimum of 1.1 KW. For a two computation appliances topology, the indicative general power consumption is at a minimum of 1.6 KW.

Apparatus Scalability and Virtualization General Principles

Figure 32:
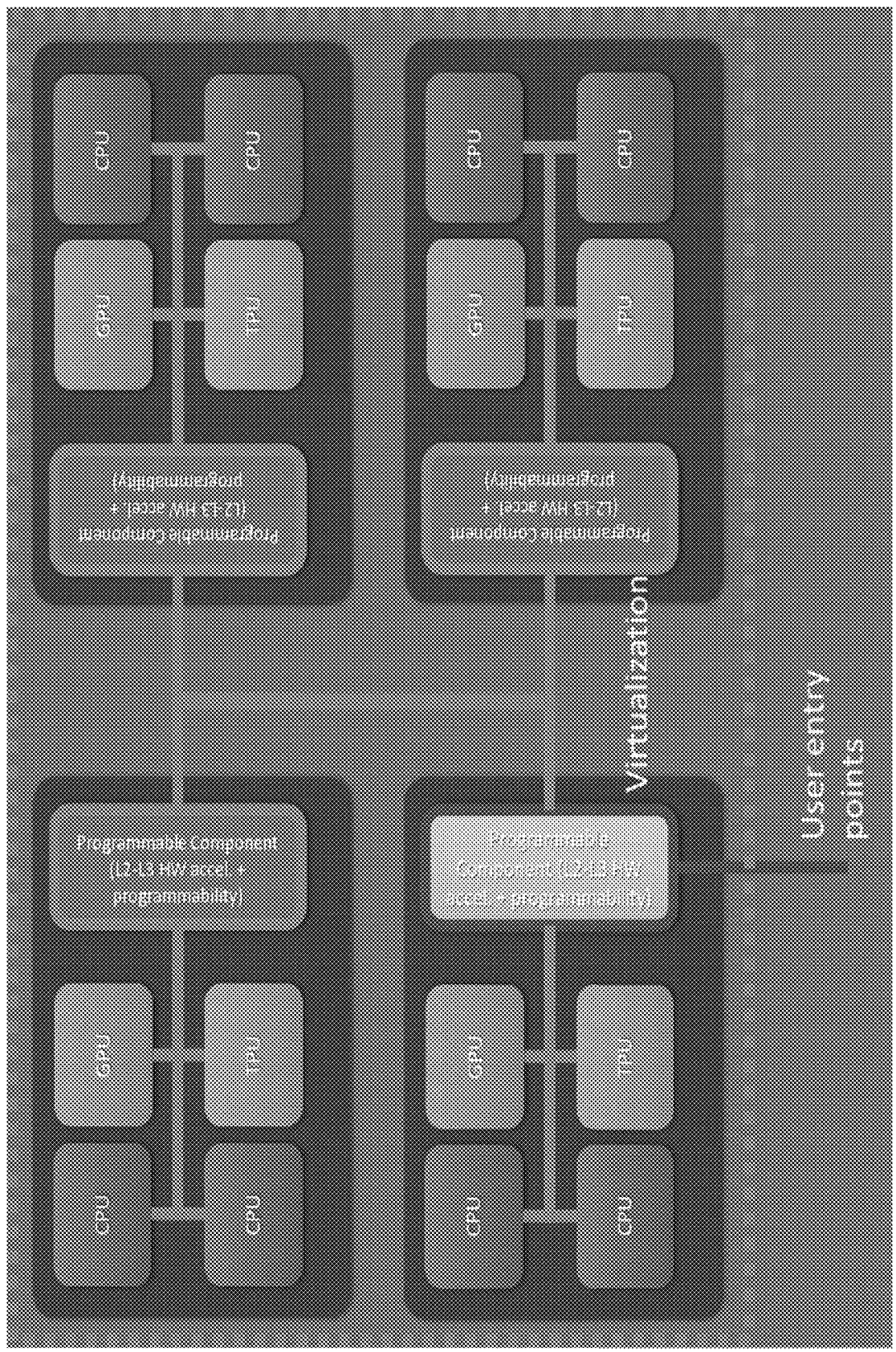
FIG. 32 is an Apparatus Virtualization and Scalability General Principles Diagram according to an embodiment of the present technology.

FIG. 32 is an Apparatus Virtualization and Scalability General Principles Diagram.

Considering that several hybrid computing apparatuses may be mutualized as a system (rectangle in dashed lines defining the system perimeter in the Figure) the programmable component of one of the hybrid computing apparatuses, qualified as a Head Apparatus, receives service calls through a single user entry point, rather than one user entry point per Apparatus (Head Apparatus and other Apparatuses, which may be qualified as Processing Apparatuses), based on the Apparatus specific software-defined networking layer 2 and layer 3 architecture. This general principle supports the Apparatus purposes on Virtualization and Scalability capabilities.

Virtualization Principles

Figure 33:
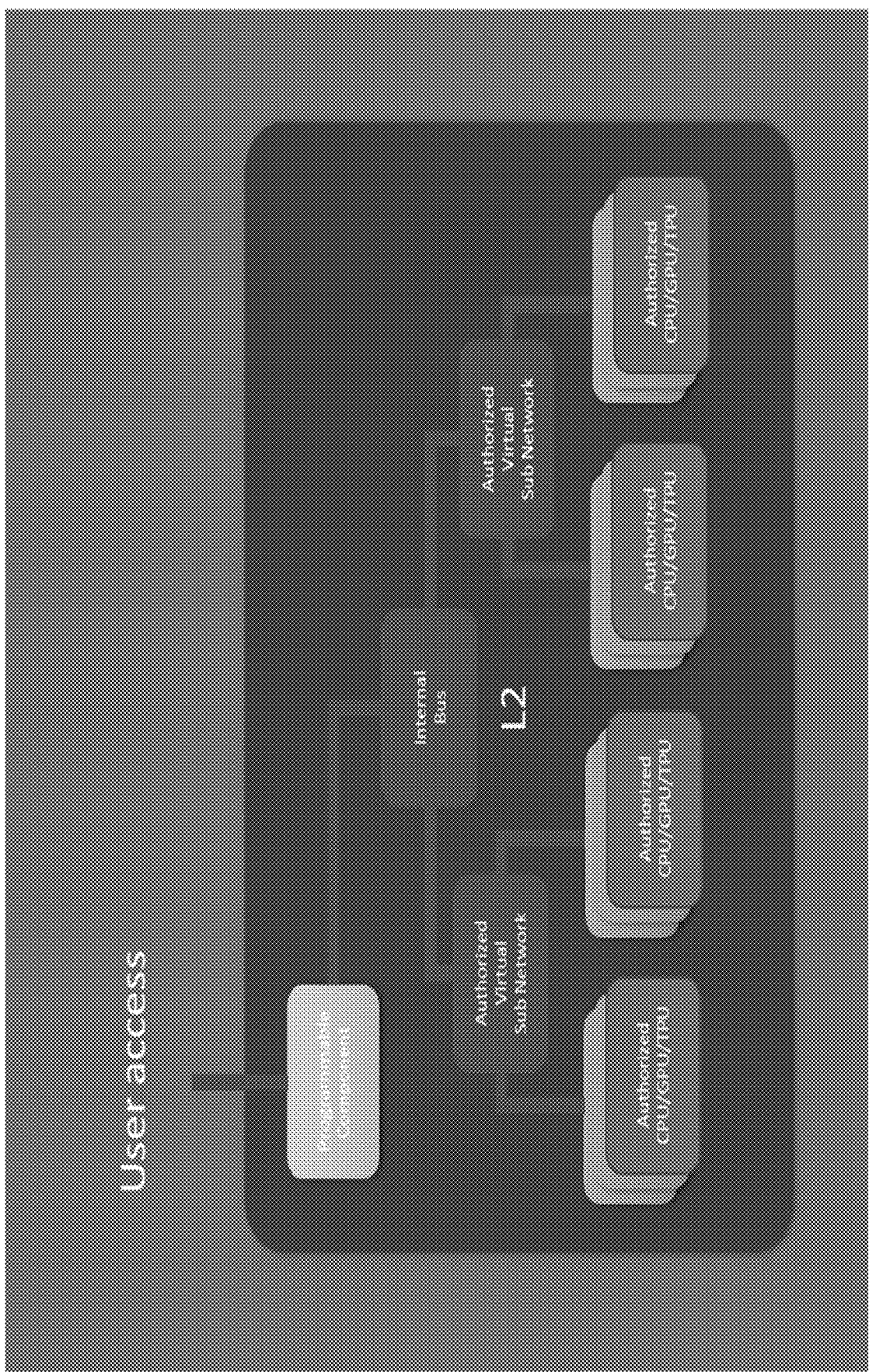
FIG. 33 illustrates Virtualization and Edge/Fog computing principles according to an embodiment of the present technology.

FIG. 33 illustrates Virtualization and Edge/Fog computing principles. The purpose here is for the Apparatus to support Service Virtualization (Including Microservices Architectures) & Edge/Fog Computing.

Through networking of multiple hybrid computing apparatuses assembled in a System, and coordinated by the programmable component of the Head Apparatus, computation resources access can be virtualized. The programmable component of the Head Apparatus may thus form a single-entry point for virtualizing the user access to service requests.

Service Virtualization algorithms themselves are very simple and consist in translating, through a virtualized networking function, a Virtual Service Call (Independent from its hardware execution context) into a corresponding Service Call addressed to a specific system and hardware execution context. If a given Service or Micro Service is not provisioned at the time, the service call virtual networking function has the possibility initiate an appropriate provisioning (Docker image mounting or similar process) prior to invoking the service on the identified resource.

This layout enables, within the Computer Appliance, to:
Rationalize virtualization costs, energy consumption and form factor.
Optimize the performances to the end users based on constant information: topological and/or physical location criteria (Edge/Fog computing).
Prepare scalability capabilities.
Benefit fully from security capabilities presented in Purpose no 3.

Considering FIG. 33, the programmable component of the Head Apparatus takes charge of serving as the single-entry point to virtualized user requests, which are not yet allocated to a processing unit (CPU/GPU/TPU), while the other programmable components of the other Apparatuses see all their features other than OSI L2 deactivated. The programmable component is thus in charge of translating, through a virtualized networking function, the Virtualized Service Request into an actual Service Request for one of the applicable Processing Units.

Scalability Principles

Figure 34:
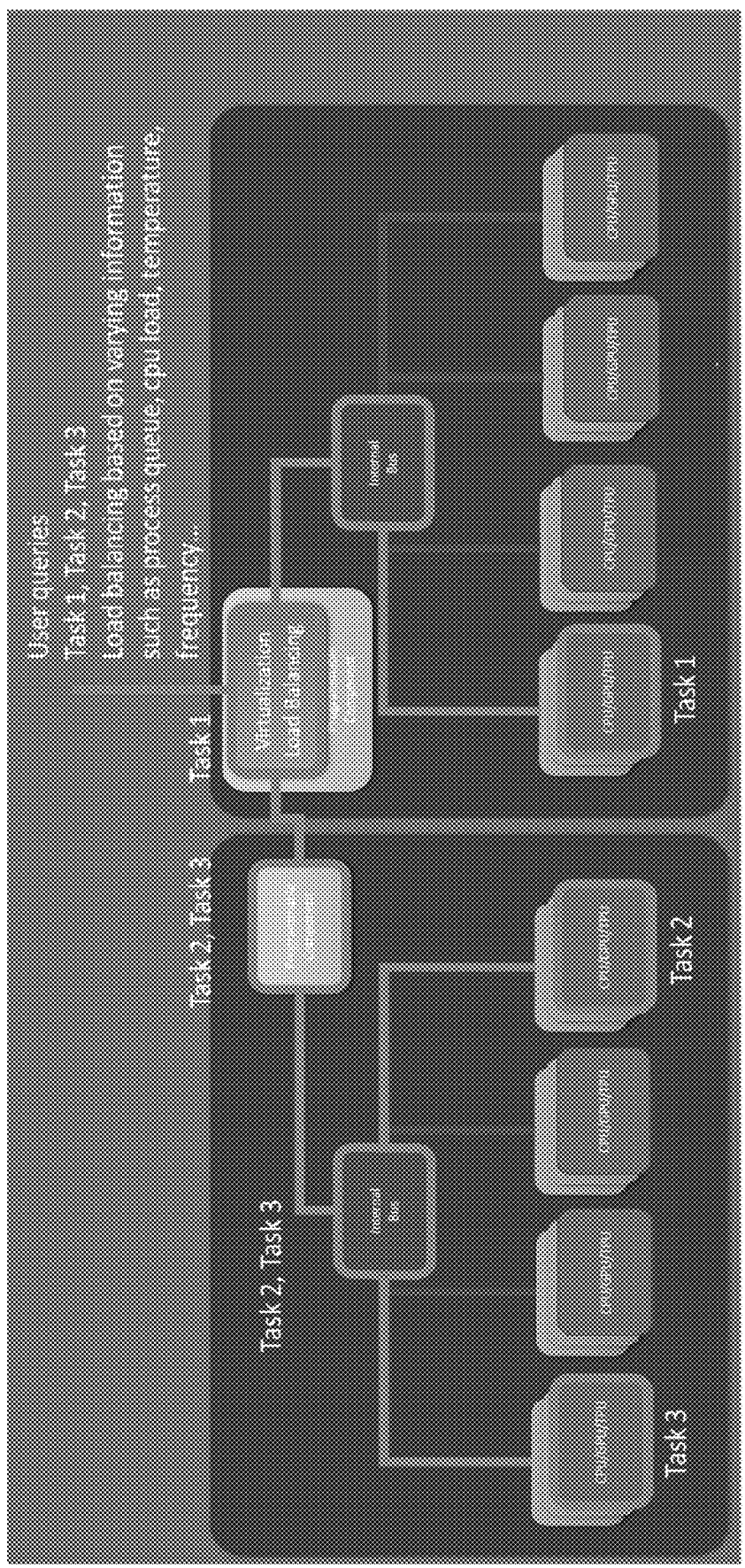
FIG. 34 illustrates Scalability and load balancing principles according to an embodiment of the present technology.

FIG. 34 illustrates Scalability and load balancing principles. The programmable component of the Head Apparatus supports networking with the similar L2 features in the Processing Apparatuses.

This layout enables, within the scaled, multiple Computer Appliance, to:
Rationalize Scalability costs, energy consumption and form factor.
Optimize the performances to the end users based on variable information: Process Queue and System Monitoring information, in one single arbitration point inferring the best system and hardware execution context for a virtual service call. The load balancing algorithms supported by the Apparatus cover the classical load balancing approaches conventionally practiced based on process queue and runtime system monitoring: Round robin, weighted round robin, least connection, weighted least connection, agent based adaptive, chained failover (Fixed weighted), weighted response time, source IP or localization hash, layer 7 content switching, global server load balancing, user based traffic steering, software-defined.
Make Scalability transparent to the appliance processes (Distribution, Parallelization, Managed Services and Cybersecurity).

FIG. 34 shows that the Programmable component of the Head Apparatus takes charge of serving as the single-entry point to virtualized user requests, which are not yet allocated to a processing unit (CPU/GPU/TPU), while the programmable components of the other Apparatuses see all their features other than OSI L2 deactivated. The programmable component is thus in charge of balancing the load according to runtime information on the system monitoring of all the Processing Units as well as the global process queue.

This enables the Apparatus to function in numbers by mutualizing their resources and efficiently providing automatic scalability and load balancing.

Apparatus Service Virtualization Model with One Appliance (On Premises, Cloud Computing, Fog Computing)

Figure 35:
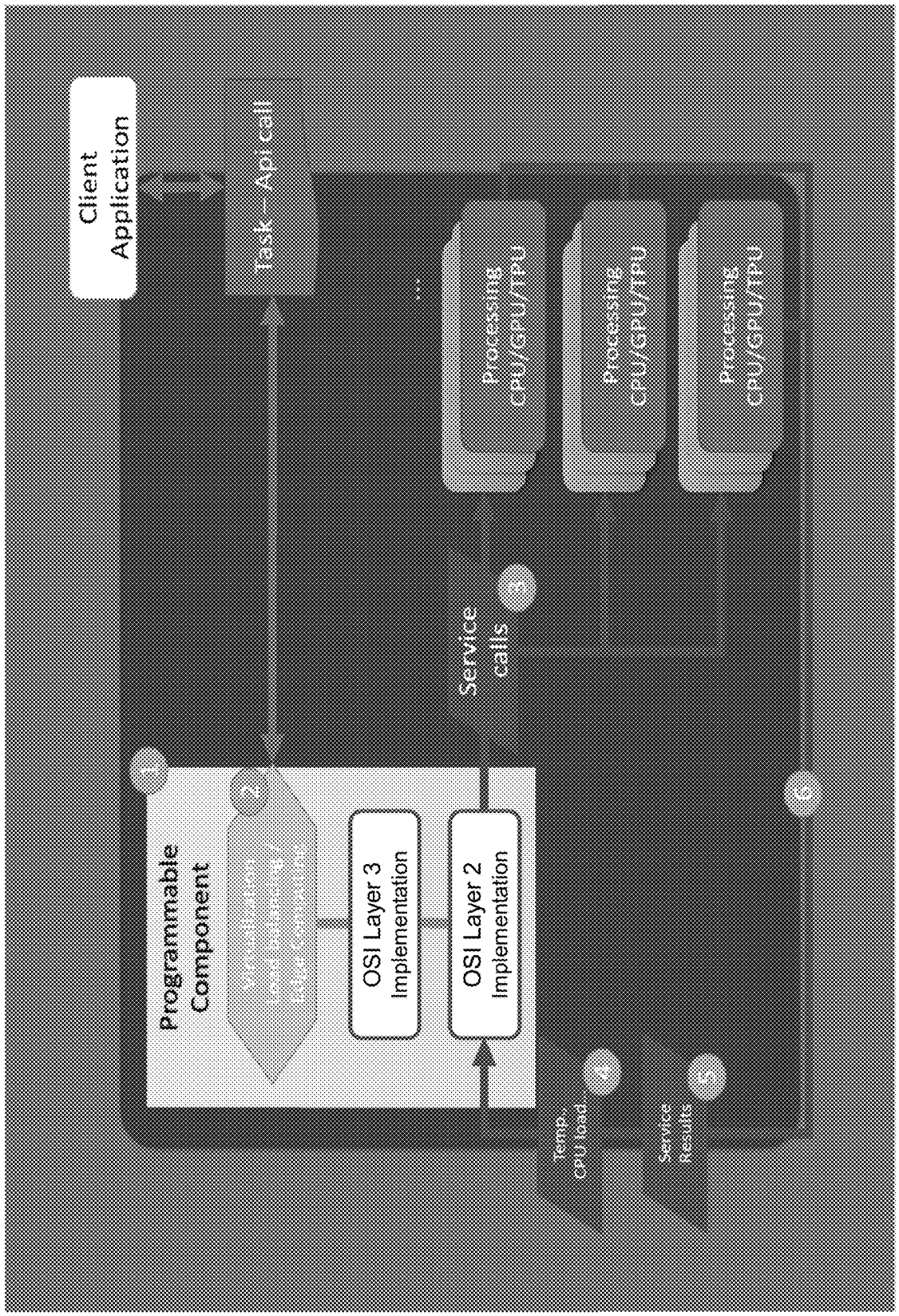
FIG. 35 is an Apparatus Scalability Model with One Appliance according to an embodiment of the present technology.

FIG. 35 is an Apparatus Scalability Model with One Appliance. FIG. 35 presents the apparatus scalability workflow based on service virtualization, with one appliance.

1. The programmable component of the single appliance receives all user API calls.
2. The virtualization function programmed inside the component takes charge of translating the virtualized service call into a service call (3) allocated to a Processing Unit (CPU/GPU/TPU). The attribution is done according to a Load Balancing approach based on both coarse grain information (Process queue) and fine grain information (System Monitoring).
3. The programmable component then uses the Apparatus specific software-defined networking layer 2 and layer 3 architecture to route the service request to the attributed Processing Unit using the bus (6).
4. System monitoring information (Temperature, CPU load . . . ) is communicated to the programmable component using the bus (6).
5. Service execution results are returned to the user through the bus (6) and the programmable component (2/1).
6. The bus (OSI L1) is operated according to the programmable component configuration (OSI L2 and L3).

Form Factor and Power Consumption Considerations

It may be noted that in such a workflow, the Apparatus takes charge of all these functionalities within a 1 U form factor, with the appliance consuming as little as 330 W.

Apparatus Service Virtualization Model with Two Appliances (On Premises, Cloud Computing, Fog Computing)

Figure 36:
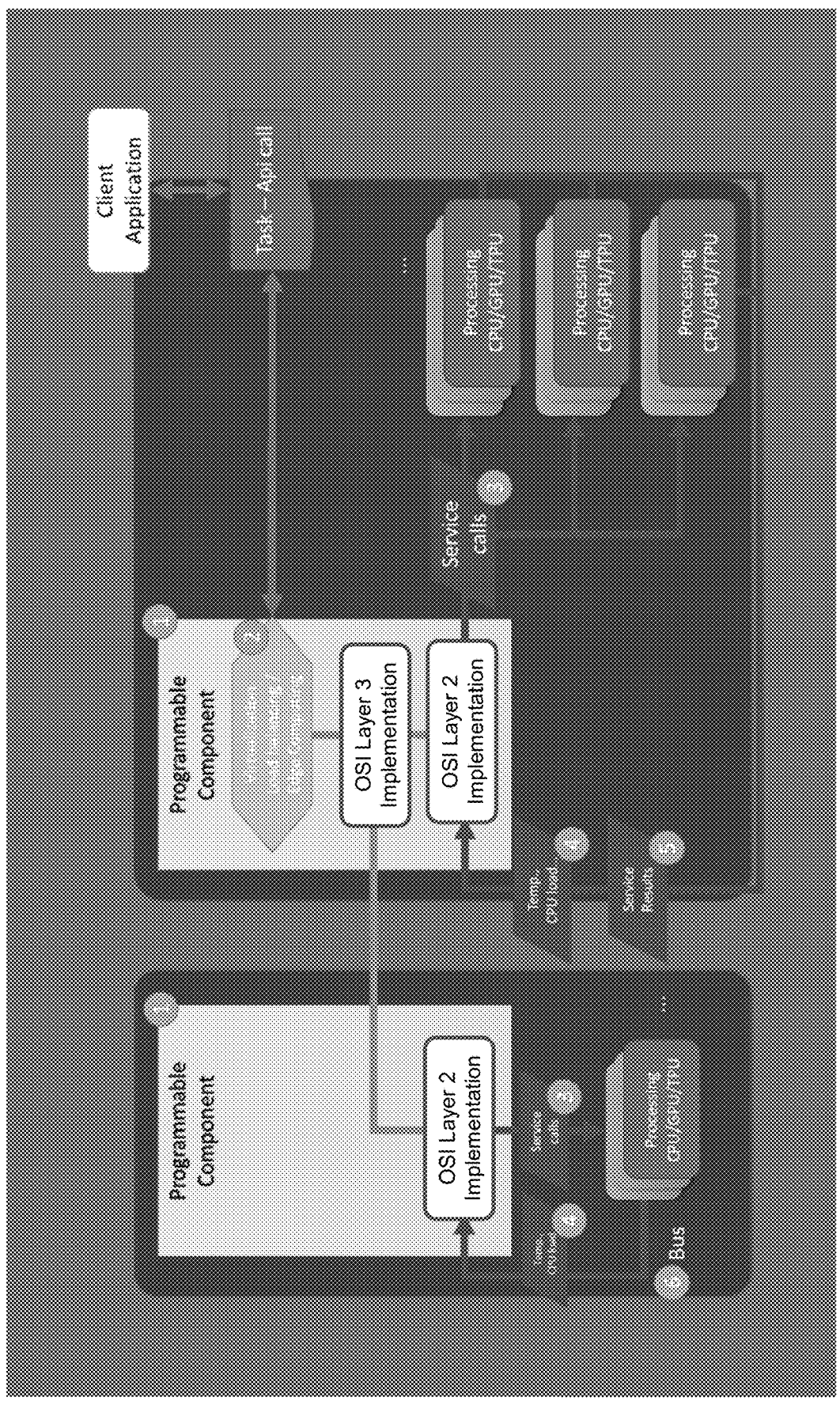
FIG. 36 illustrates Apparatus Service Virtualization Model with two (N) appliances according to an embodiment of the present technology.

FIG. 36 illustrates Apparatus Service Virtualization Model with two (N) appliances.

FIG. 36 presents the apparatus scalability workflow based on service virtualization, with two appliances, but the same model is applicable by similarity to N appliances.

1. The programmable component of the head Apparatus (Appliance) receives all user API calls. The Head Apparatus (Appliance) is determined automatically at the interconnection of two apparatus through an arbitration procedure excluding deadlocks, all other Apparatus being configured automatically as Processing Apparatus. A Processing Apparatus sees the features of its programmable component deactivated, with the exclusion of its routing capabilities (L2/Switch). As a result, only the Head Apparatus takes charge of virtualization and routing features.
7. The virtualization function programmed inside the programmable component in the Head Apparatus takes charge of translating the virtualized service call into a service call (3) allocated to a Processing Unit (CPU/GPU/TPU). The attribution is done over 2 or N Apparatus according to a Load Balancing approach based on both coarse grain information (Process queue) and fine grain information (System Monitoring), enabling efficient Scalability.
2. The programmable component then uses the packaged routing in the software-defined OSI L3 in the Head Apparatus and the L2 software-defined networking in all the Apparatus (Head and Processing) to route the service request to the attributed Processing Unit using the bus (6)
3. System monitoring information (Temperature, CPU load . . . ) is communicated to the programmable component of the Head Apparatus using the bus (6)
4. Service execution results are returned to the user through the bus (6) and the programmable component (2/1)
5. The global bus (OSI L1) over all Apparatus is operated according to the programmable component configuration of the Head Apparatus (OSI L3) and all Processing Apparatus (OSI L2).

Form Factor and Power Consumption Considerations

It may be noted that in such a workflow, the Apparatus takes charge of all these functionalities within a 1 U form factor, with the appliance consuming as little as 660 W for two appliances in a 2 U form factor, or N×330 W for N appliances in a N×1 U form factor, to be opposed to the conventional model form factor and power consumption.

Figure 37:
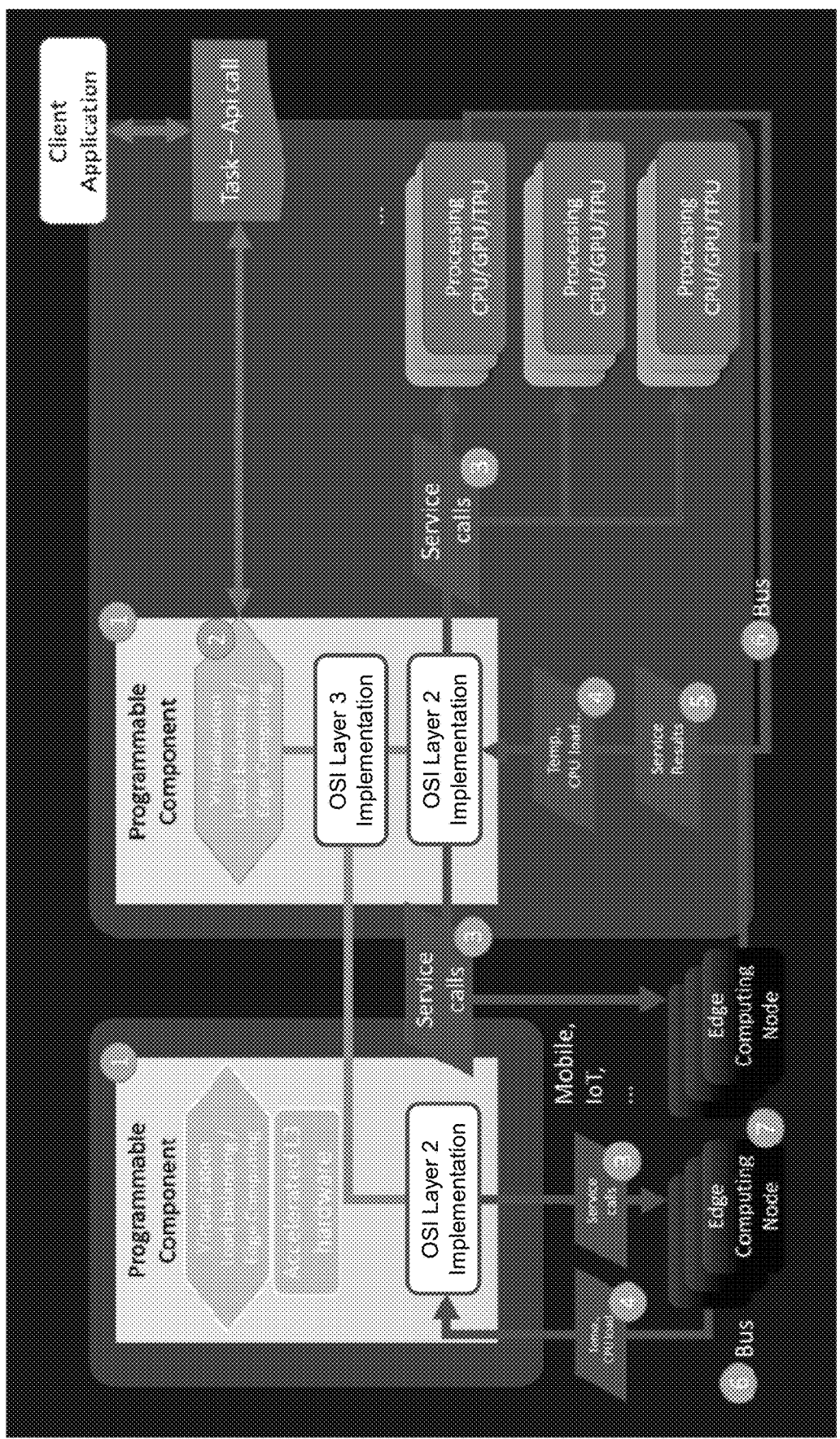
FIG. 37 illustrates Apparatus Service Virtualization Model with two (N) appliances and Edge Computing Nodes (Edge Computing) according to an embodiment of the present technology.

Apparatus Service Virtualization Model with Two Appliances and Edge Computing Nodes FIG. 37 illustrates Apparatus Service Virtualization Model with two (N) appliances and Edge Computing Nodes (Edge Computing).

FIG. 37 presents the apparatus scalability workflow based on service virtualization, with two appliances, but the same model is applicable by similarity to N appliances.
1. The programmable component of the head Apparatus (Appliance) receives all users API calls. The Head Apparatus (Appliance) is determined automatically at the interconnexion of two apparatus through an arbitration procedure excluding deadlocks, all other Apparatus being configured automatically as Processing Apparatus. A Processing Apparatus sees all its programmable component's features deactivated, with the exclusion of its routing capabilities (L2/Switch). As a result, only the Head Apparatus takes charge of virtualization and routing features.
8. The virtual networking function embedded inside the programmable component in the Head Apparatus takes charge of translating the virtualized service call into a service call (3) allocated to a Processing Unit (CPU/GPU/TPU). The attribution is done over 2 or N Apparatus according to a Load Balancing approach based on both coarse grain information (Process queue) and fine grain information (System Monitoring), enabling efficient Scalability.
2. The programmable component then uses the packaged routing hardware OSI L3 in the Head Apparatus and the L2 features in all the Apparatus (Head and Processing) to route the service request to the attributed Processing Unit using the bus (6)
3. System monitoring information (Temperature, CPU load . . . ) is communicated to the programmable component of the Head Apparatus using the bus (6)
4. Service execution results are returned to the user through the bus (6) and the programmable component (2/1)
5. The global bus (OSI L1) over all Apparatus is operated according to the programmable component configuration of the Head Apparatus (OSI L3) and all Processing Apparatus (OSI L2).
6. Edge Computing Nodes can be reached through the very same service calls as Processing Units, they support the same load balancing approaches and return similar Services Results. The proposed Hybrid Computing Architecture supports addressing them with the exact same paradigm.

Conclusion

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A hybrid computing apparatus, comprising:
a hardware programmable component configured to execute a management module, the management module being configured to execute:
a layer 3 software-defined networking component; and
a layer 2 software-defined networking component;
the management module being further configured for:
injecting optimization functionality at at least one of the layer 3 software-defined networking component and/or the layer 2 software-defined networking component, the optimization functionality comprising a list of plurality of processing units and service call information, the service call information corresponding to at least one of a load balancing service call, a rationalization service call, and data governance service call,
causing to execute the optimization functionality;
receiving a task from a client application,
defining the service call for the received task, comprising:
splitting the task call into a plurality of service calls, the plurality of service calls comprising at least one of the load balancing service call, the rationalization service call, and the data governance service call;
receiving a plurality of sub-results; and
combining the plurality of sub-results into a service result for transmitting the service result to the client application;
wherein the layer 3 software-defined networking component; and the layer 2 software-defined networking component are further configured for:
receiving the service call via the layer 3 software-defined networking component,
transmitting the plurality of service calls to a subset of the plurality of processing units selected based on the injected optimization functionality,
receiving the plurality of sub-results from the subset of the plurality of processing units, and
forwarding and coordinating the plurality of sub-results to the management module via the layers 2 and 3 software-defined networking components.

2. The hybrid computing apparatus of claim 1, wherein:
the layer 3 software-defined networking component uses layer 3 hardware acceleration; and the layer 2 software-defined networking component uses layer 2 hardware acceleration.

3. The hybrid computing apparatus of claim 1, wherein the management module is further configured for:
receiving data governance information defining rules for authorizing access to user data;
receiving an identity of a user from a user directory; and
selecting the processing unit based on an information triplet including the identity of a user, data for the user, and a list of authorized processing units authorized to access the data for the user, the list being determined according to the data governance information.

4. The hybrid computing apparatus of claim 1, wherein the management module is further configured for:
receiving a software update package for the plurality of processing units from an operation system docker;
receiving a command to deploy the software update from a system administrator; and
deploying the software update to plurality of processing units without establishing a direct interface between the system administrator and plurality of processing units, whereby the system administrator is prevented from accessing data present in plurality of processing units.

5. The hybrid computing apparatus of claim 3, wherein:
the layer 2 software-defined networking component is further configured for:
receiving temperature measurements from each of the plurality of processing units, and
forwarding the temperature measurements to the management module via the layer 3 software-defined networking component; and
the management module of the first hybrid computing apparatus is further configured for assigning each of the plurality of service calls to selected ones of the plurality of processing units based on their respective temperature measurements.

6. A combination, comprising:
a first hybrid computing apparatus as defined in claim 1; and
a second hybrid computing apparatus as defined in claim 1, the management module and a layer 3 software-defined networking component of the second hybrid computing apparatus being disabled, a layer 2 software-defined networking component of the second hybrid computing apparatus being communicatively connected to the layer 3 software-defined networking component of the first hybrid computing apparatus.

7. A combination, comprising:
a first hybrid computing apparatus as defined in claim 1; and
a second hybrid computing apparatus comprising a layer 2 software-defined networking component being communicatively connected to a layer 3 software-defined networking component of the first hybrid computing apparatus.

8. The combination of claim 6, wherein the first hybrid computing apparatus is a head apparatus and the second hybrid computing apparatus is a processing apparatus.

9. The combination of claim 6, wherein:
the layer 2 software-defined networking component of the first hybrid computing apparatus is further configured for:
transmitting a first subset of the plurality of service calls to a first subset of the plurality of processing units,
receiving a first subset of the plurality of sub-results from the first subset of the plurality of processing units, and
forwarding the first subset of the plurality of sub-results to the management module via the layer 3 software-defined networking component of the first hybrid computing apparatus; and
the layer 2 software-defined networking component of the second hybrid computing apparatus is further configured for:
transmitting a second subset of the plurality of service calls to a second subset of the plurality of processing units,
receiving a second subset of the plurality of sub-results from the second subset of the plurality of processing units, and
forwarding the second subset plurality of sub-results to the management module via the layer 3 software-defined networking component of the first hybrid computing apparatus.

10. The combination of claim 9, wherein the management module of the first hybrid computing apparatus is further configured for causing the layer 3 software-defined networking component of the first hybrid computing apparatus to forward the first subset of the plurality of service calls to the layer 2 software-defined networking component of the first hybrid computing apparatus and to forward the second subset of the plurality of service calls to the layer 2 software-defined networking component of the second hybrid computing apparatus.

11. The combination of claim 9, wherein:
the layer 2 software-defined networking component of the first hybrid computing apparatus is further configured for:
receiving first temperature measurements from each of the first subset of the plurality of processing units, and
forwarding the first temperature measurements to the management module via the layer 3 software-defined networking component of the first hybrid computing apparatus;
the layer 2 software-defined networking component of the second hybrid computing apparatus is further configured for:
receiving second temperature measurements from each of the second subset of the plurality of processing units, and
forwarding the second temperature measurements to the management module via the layer 3 software-defined networking component of the first hybrid computing apparatus; and
the management module of the first hybrid computing apparatus is further configured for assigning each of the plurality of service calls to selected ones of the plurality of processing units based on their respective temperature measurements.

12. The combination of claim 6, further comprising one or more additional hybrid computing apparatuses, each additional hybrid computing apparatus comprising a respective layer 2 software-defined networking component being communicatively connected to the layer 3 software-defined networking component of the first hybrid computing apparatus.

13. A hybrid computing architecture, comprising:
the hybrid computing apparatus as defined in claim 1;
a client application configured for submitting a task to the hybrid computing apparatus; and one or more processing units configured for executing one or more service calls related to the task.

14. A hybrid computing architecture, comprising:
the combination as defined in claim 6;
a client application configured for submitting a task to the first hybrid computing apparatus; and
one or more processing units configured for executing one or more service calls related to the task.

\* \* \* \* \*